United States Patent
Banat et al.

(10) Patent No.: US 9,975,968 B2
(45) Date of Patent: May 22, 2018

(54) PROCESS FOR CONTINUOUS POLYMERIZATION OF OLEFIN MONOMERS IN A REACTOR

(71) Applicants: SAUDI BASIC INDUSTRIES CORPORATION, Riyadh (SA); SABIC GLOBAL TECHNOLOGIES B.V., Bergen op Zoom (NL)

(72) Inventors: Yahya Banat, Geleen (NL); Jose Fernando Cevallos-Candau, Charleston, WV (US)

(73) Assignees: SABIC GLOBAL TECHNOLOGIES B.V., Bergen op Zoom (NL); SAUDI BASIC INDUSTRIES CORPORATION, Riyadh (SA)

( * ) Notice: Subject to any disclaimer, the term of this patent is extended or adjusted under 35 U.S.C. 154(b) by 0 days. days.

(21) Appl. No.: 15/100,498

(22) PCT Filed: Nov. 24, 2014

(86) PCT No.: PCT/EP2014/075410
§ 371 (c)(1),
(2) Date: May 31, 2016

(87) PCT Pub. No.: WO2015/078814
PCT Pub. Date: Jun. 4, 2015

(65) Prior Publication Data
US 2017/0002113 A1 Jan. 5, 2017

Related U.S. Application Data

(60) Provisional application No. 61/929,602, filed on Jan. 21, 2014.

(30) Foreign Application Priority Data

Nov. 29, 2013 (EP) ..................................... 13195142

(51) Int. Cl.
C08F 2/00 (2006.01)
C08F 210/00 (2006.01)
(Continued)

(52) U.S. Cl.
CPC ............... C08F 10/00 (2013.01); B01J 8/005 (2013.01); B01J 8/0015 (2013.01); B01J 8/085 (2013.01);
(Continued)

(58) Field of Classification Search
CPC ...... C08F 2/34; C08F 2/01; C08F 2/00; C08F 10/00; C08F 10/02; C08F 10/06;
(Continued)

(56) References Cited

U.S. PATENT DOCUMENTS 2,602,647 A 7/1952 Miller
3,254,070 A 5/1966 Roelen
(Continued)

FOREIGN PATENT DOCUMENTS

EP 0059080 A2 9/1982
EP 0089691 A2 9/1983
(Continued)

OTHER PUBLICATIONS

Hamielec et al.;"Polymerization Reaction Engineering—Metallocene Catalysts"; Prog. Polym. Sci., 1996, vol. 21, pp. 651-706.
(Continued)

Primary Examiner — William Cheung
(74) Attorney, Agent, or Firm — Cantor Colburn LLP

(57) ABSTRACT

The invention relates to a system for the continuous polymerization of α-olefin monomers comprising a reactor, a compressor, a cooling unit and an external pipe, wherein the reactor comprises a first outlet for a top recycle stream, wherein the system comprises apparatus, wherein the reactor comprises a first inlet for receiving a bottom recycle stream,
(Continued)

wherein the reactor comprises an integral separator, wherein the first inlet of the integral separator is connected to a first outlet, wherein the first outlet for the liquid phase is connected to the second outlet of the reactor for the liquid phase, wherein the external pipe comprises a second inlet for receiving a solid polymerization catalyst, wherein the first outlet of the external pipe is connected to a second inlet of the reactor, wherein the reactor comprises a third outlet, wherein the system comprises a first inlet for receiving a feed.

16 Claims, 11 Drawing Sheets

(51) Int. Cl.
| | | |
|---|---|---|
| *B01J 8/18* | (2006.01) | |
| *C08F 10/00* | (2006.01) | |
| *C08F 2/34* | (2006.01) | |
| *B01J 8/00* | (2006.01) | |
| *B01J 8/08* | (2006.01) | |
| *B01J 19/06* | (2006.01) | |
| *B01J 19/24* | (2006.01) | |
| *C08F 10/02* | (2006.01) | |
| *C08F 10/06* | (2006.01) | |

(52) U.S. Cl.
CPC ............... *B01J 8/087* (2013.01); *B01J 19/06* (2013.01); *B01J 19/246* (2013.01); *C08F 2/34* (2013.01); *B01J 2208/00752* (2013.01); *B01J 2208/00761* (2013.01); *B01J 2208/00938* (2013.01); *B01J 2219/182* (2013.01); *C08F 10/02* (2013.01); *C08F 10/06* (2013.01)

(58) Field of Classification Search
CPC ..... B01J 8/0015; B01J 8/87; B01J 8/85; B01J 8/005; B01J 19/06; B01J 19/246; B01J 2219/182; B01J 2208/00938; B01J 2208/00761; B01J 2208/00752
USPC .................................. 526/64, 348; 422/139
See application file for complete search history.

(56) References Cited

U.S. PATENT DOCUMENTS

| | | | |
|---|---|---|---|
| 3,298,792 A | 1/1967 | Drusco | |
| 4,518,750 A | 5/1985 | Govoni et al. | |
| 4,933,149 A | 6/1990 | Rhee et al. | |
| 5,143,705 A | 9/1992 | Platz | |
| 5,381,827 A | 1/1995 | Koura et al. | |
| 5,462,999 A | 10/1995 | Griffin et al. | |
| 5,627,243 A | 5/1997 | Hamalainen et al. | |
| 6,391,985 B1 | 5/2002 | Goode et al. | |
| 6,403,730 B1 | 6/2002 | Mutsers | |
| 6,441,108 B1 | 8/2002 | Haendeler et al. | |
| 6,472,463 B1 | 10/2002 | Goode et al. | |
| 6,759,489 B1 | 7/2004 | Turkistani | |
| 7,226,565 B2 | 6/2007 | Knauer et al. | |
| 8,354,483 B2 | 1/2013 | Bergstra et al. | |
| 9,637,572 B2* | 5/2017 | Banat ........................ | C08F 2/34 |
| 2009/0062586 A1 | 3/2009 | Hamba | |
| 2010/0267915 A1 | 10/2010 | Bergstra et al. | |
| 2010/0273971 A1 | 10/2010 | Bergstra et al. | |
| 2011/0152489 A1 | 6/2011 | Dumas et al. | |
| 2016/0297899 A1 | 10/2016 | Banat et al. | |
| 2016/0297900 A1 | 10/2016 | Banat et al. | |

FOREIGN PATENT DOCUMENTS

| | | | |
|---|---|---|---|
| EP | 0095848 A2 | 12/1983 | |
| EP | 1764378 A1 | 3/2007 | |
| EP | 2495037 A1 | 9/2012 | |
| WO | 0044792 A1 | 8/2000 | |
| WO | 0069552 A1 | 11/2000 | |
| WO | 0240146 A1 | 5/2002 | |
| WO | 2007071527 A1 | 6/2007 | |
| WO | WO 2997/071527 A1 * | 6/2007 | |
| WO | 2011147539 A1 | 12/2011 | |

OTHER PUBLICATIONS

International Search Report for International Application No. PCT/EP2014/075410; dated Jan. 29, 2015; 6 pages.
International Search Report for International Application No. PCT/EP2014/075411; dated Jan. 26, 2015; 6 pages.
International Search Report for International Application No. PCT/EP2014/075412; dated Jan. 26, 2015; 6 pages.
Peacock, "Handbook of Polyethylene: Structures, Properties, and Applications", 2000, pp. 61-62.
Written Opinion of the International Search Report for International Application No. PCT/EP2014/075410; dated Jan. 29, 2015; 12 pages.
Written Opinion of the International Search Report for International Application No. PCT/EP2014/075411; dated Jan. 26, 2015; 11 pages.
Written Opinion of the International Search Report for International Application No. PCT/EP2014/075412; dated Jan. 26, 2015; 5 pages.

* cited by examiner

PROCESS FOR CONTINUOUS POLYMERIZATION OF OLEFIN MONOMERS IN A REACTOR

CROSS REFERENCE TO RELATED APPLICATIONS

This application is a 371 of International Application No. PCT/EP2014/075410, filed Nov. 24, 2014, which claims priority to U.S. Application No. 61/929,602, filed Jan. 21, 2014, and European Application No. 13195142.8, filed Nov. 29, 2013, all of which are incorporated herein by reference in their entirety.

The invention relates to a process for the continuous polymerization of olefin monomers in a reactor, to a reaction system suitable for use in said process and to polyolefins obtainable with said process.

There are many different processes for the polymerization of olefin monomers, including gas-phase fluidized bed processes, slurry, loop or stirred tank reactors, suspension and solution processes.

The discovery of the process for the production of polyolefins in fluidized beds has provided a means for the production of a diverse array of polyolefins such as polyethylene, polypropylene, and polyolefin copolymers. Using a fluidized bed polymerization process substantially reduces the energy requirements as compared to other processes and most importantly reduces the capital investment required to run such a process to produce polymers.

Gas fluidized bed polymerization plants generally employ a continuous cycle. In one part of the cycle, in a reactor a cycling gas stream is heated by the heat of polymerization. This heat is removed in another part of the cycle by a cooling system external to the reactor.

However, gas fluidized bed reactors include various limitations, for example they have a limited heat removal of the heat produced during the exothermic polymerization of the olefin monomers.

If heat is not sufficiently removed, various undesired effects occur, such as degradation of the polymerization catalyst, degradation of polyolefin produced, agglomeration of the polyolefin and/or chunking of the polyolefin. Consequently, the overall effect of a limitation in heat removal, is a limitation of the rate of production of the polyolefin.

Consequently, there have been many developments to increase heat removal.

For example, a more efficient way to achieve heat removal is by optionally introducing an inert condensing agent and cooling the gaseous recycle stream to a temperature below its dew point, resulting in the condensation of at least part of the recycle stream to form a bottom recycle stream containing liquid and gas. The thus formed bottom recycle stream is then introduced into the fluidized bed polymerization reactor, where the liquid portion will vaporize upon exposure to the heat of the reactor, which vaporization will remove heat from the reactor. This mode of operation is known in the art as a "condensing mode" or "condensed mode" process.

However, the heat removal that can be achieved in such condensed mode is still limited, since the current reactors, reaction systems and processes for the production of polyolefins using a fluidized bed and a condensed mode do not allow large amounts of liquid in the recycle stream as this causes destabilization of the fluidized bed.

For example, EP 89 691 A2 discloses a process for increasing polymer production in a fluidized bed reactor employing an exothermic polymerization reaction by cooling the recycle stream to below its dew point and returning the resultant two-phase fluid stream to the reactor to maintain the fluidized bed at a desired temperature above the dew point of the recycle stream. The inventors of EP 89 691 A2 found that the amount of condensation of liquid in the recycle stream could be maintained at up to about 20 percent by weight.

For example, WO00/44792A1 discloses a continuous process for the manufacture of olefin polymers in a continuous gas phase polymerization reaction wherein monomer, after passage through the fluidized bed, is cooled to a temperature below its dew point to produce a mixture of cold gas and liquid. All or part of the cold gas is introduced into the bottom of the reactor to serve as the fluidizing gas stream for the fluidized bed. Cold liquid separated from the liquid is warmed to form a heated fluid by passing in indirect heat exchange relation with the fluidized bed and the heated fluid is then injected directly into the bed; combined with the fluidizing gas stream; sprayed on top of the bed or combined with gaseous monomer removed from the fluidized bed for cooling.

In order to increase the cooling capacity and therefore the production rate, it is therefore desirable to allow larger amounts of liquid in the recycle stream without causing destabilization of the fluidized bed.

Therefore, it is the object of the invention to provide a process for the continuous polymerization of olefin monomers in a fluidized bed reactor, wherein larger amounts of liquid can be maintained in the recycle stream.

This object is achieved by a process for the continuous polymerization of one or more α-olefin monomers of which at least one is ethylene or propylene comprising the steps of:
(1) feeding the one or more α-olefins to a vertically extended reactor suitable for the continuous fluidized bed polymerization of one or more α-olefin monomers of which at least one is ethylene or propylene, which reactor is operable in condensed mode, wherein the reactor comprises a distribution plate and an integral gas/liquid separator located below the distribution plate
(2) withdrawing the polyolefin from the reactor
(3) withdrawing fluids from the top of the reactor
(4) cooling the fluids to below their dew point, resulting in a bottom recycle stream
(5) introducing the bottom recycle stream under the distribution plate
(6) separating at least part of the liquid from the bottom recycle stream using the integral separator to form a liquid phase and a gas/liquid phase
(7) feeding the liquid phase to an external pipe
(8) adding a solid polymerization catalyst to the liquid phase in the external pipe resulting in the formation of a slurry stream comprising prepolymer and/or polymer and
(9) feeding the slurry stream comprising the prepolymer and/or polymer into the reactor above the distribution plate, wherein the prepolymer and/or polymer are present in the slurry stream in an amount of from 0.01 to 99 wt %, for example to 90 wt %, for example to 70 wt %, for example to 60 wt % based on the total slurry stream upon introduction of the slurry stream into the reactor.

In this context, liquid phase means liquid, whereas gas/liquid phase means a stream comprising gas and liquid.

It has been found that by the process of the invention, it is possible to introduce larger amounts of liquids, for example up to 50 wt % liquids based on total feed into the reactor without destabilization or defluidization of the fluidized bed. Further, by using the process of the invention, the superficial gas velocity in the reactor may be increased.

Furthermore, with the process of the invention, an increase in the space-time-yield of a reactor may be obtained. In other words, the rate of the production of the polyolefin within a multi-zone reactor of the same size may be increased, for instance by 20%, using the process of the invention.

Also, with the process of the invention, the catalyst productivity may be improved, for example by 10%.

Moreover, in the process of the invention less fines and less statics may be produced, which may lead as a consequence to a) a reduction in fouling of the distribution plate and/or b) less sheeting on the reactor wall.

Also, it is possible to perform the (pre)polymerization at conditions different from the conditions in the multi-zone reactor, making it possible to produce a wide variety of different polyolefins.

The polyolefins that may be produced in the process of the invention may have a higher bulk density and/or a higher homogeneity.

The one or more α-olefin monomers may be fed to the reactor, preferably a multi-zone reactor using feeding means such as a pump. The monomers are preferably fed to the reactor by adding the monomers to the fluids that are circulated from the top of the reactor to the first zone prior to cooling of the fluids. Preferably, the one or more α-olefin monomers are added in such amounts that they make up for the one or more α-olefin monomer consumed during the polymerization.

The one or more α-olefin monomers may be fed in one or in multiple feeding streams. For example, one type of olefin monomer, typically ethylene and/or propylene may be comprised in the feed (60) and another type of α-olefin monomer, also referred to herein as the comonomer, may be comprised in the feed (70).

Withdrawal of the polyolefin (30) from the reactor may be done at any position in the area above the distribution plate or at a combination of positions, for example in case of the multi-zone reactor as described herein, the polyolefin may be withdrawn from the bottom part of the second zone (2), the top part of the second zone (2), the bottom part of the third zone (3) and/or the top part of the third zone (3). Preferably, in case of the multi-zone reactor the polyolefin is withdrawn from the bottom part of the second zone (2) and/or from the bottom part of the third zone (3).

Polyolefin (30) may be withdrawn from the reactor using any suitable means, for example a polymer discharge system. The polyolefin may be used as such or may be subjected to purification or other end-processing.

The fluids may be withdrawn from the top of the reactor using any suitable means, for example a compressor may be used.

With 'continuous polymerization of one or more α-olefins' or 'continuous preparation of polyolefin' is meant herein that one or more α-olefin monomers of which at least one is ethylene or propylene are fed to the multi-zone reactor and polyolefin thus produced is (semi)-continuously withdrawn through a polymer discharge system connected to the multi-zone reactor.

In the process for the continuous polymerization one of the α-olefin monomers is ethylene or propylene. Other α-olefin monomers may be present. Examples of other α-olefin monomers include for example α-olefins having from 4 to 8 carbon atoms. However, small quantities of α-olefin monomers having more than 8 carbon atoms, for example 9 to 18 carbon atoms, such as for example a conjugated diene, can be employed if desired. Thus it is possible to produce homopolymers of ethylene or propylene or copolymers of ethylene and/or propylene with one of more α-olefin monomers having from 4 to 8 α-olefin monomers. Preferred α-olefin monomers include but are not limited to but-1-ene, isobutene, pent-1-ene, hex-1-ene, hexadiene, isoprene, styrene, 4-methylpent-1-ene, oct-1-ene and butadiene. Examples of α-olefin monomers having more than 8 carbon atoms that can be copolymerized with an ethylene and/or propylene monomer, or that can be used as partial replacement for α-olefin monomers having from 4 to 8 α-olefin monomers include but are not limited to dec-1-ene and ethylidene norbornene.

When the system or process of the invention is used for the copolymerization of ethylene and/or propylene with α-olefin monomers, the ethylene and/or propylene preferably is used as the major component of the copolymer. For example, the amount of ethylene and/or propylene present in the copolymer is at least 65% by weight, for example at least 70% by weight, for example at least 80% by weight based on the total copolymer.

With 'condensed mode' is meant that a liquid containing stream is used to cool the reactor (8).

The distribution plate (6) may be any device that is suitable for distributing the bottom recycle stream in the multi-zone reactor (8) to keep a fluidized bed in the second zone (2) of the multi-zone reactor (8) and to serve as a support for a quiescent bed of the solid polymerization catalyst and polyolefin when the multi-zone reactor (8) is not in operation. For example, the distribution plate may be a screen, slotted plate, perforated plate, a plate of the bubble-cap type, or other conventional or commercially available plate or other fluid distribution device. An example of a commonly used type of distribution plate is a perforated plate with some above-hole structure on top of each hole, to prevent particle sifting. In the figures, the distribution plate (6) is indicated with a dotted line.

The distribution plate is generally positioned perpendicular to the longitudinal axis of a reactor, wherein the fluidized bed is located above said distribution plate and a mixing chamber region (zone 1) below said distribution plate.

The distribution plate is used for achieving good gas distribution. It may be a screen, slotted plate, perforated plate, a plate of the bubble-cap type, or the like. The elements of the plate may all be stationary or the plate may be of the mobile type disclosed in U.S. Pat. No. 3,298,792. Mechanically swept distribution grids are described in U.S. Pat. No. 3,254,070. Whatever its design, it must diffuse the recycle fluid through the particles at the base of the bed to keep the bed in a fluidized condition and also serve to support a quiescent bed of resin particles when the reactor is not in operation.

For purpose of this invention, the preferred type distribution plate is generally of the type which is fabricated from metal and which has holes distributed across its surface. The holes are normally of a diameter of about one-half inch. The holes extend through the plate and over the holes there are positioned angle caps which are fixedly mounted to the plate. Alternate rows of angle irons are oriented at angles to each other, preferably at 60 degrees, in alternate parallel alignment as shown in FIG. 4 of U.S. Pat. No. 4,933,149. They serve to distribute the flow of fluid along the surface of the plate so as to avoid stagnant zones of solids. In addition, they prevent resin particles from falling through the holes when the bed is settled or quiescent.

The distribution plate may for example have the shape of a cone, as for example described in U.S. Pat. No. 2,602,647A1, hereby incorporated by reference, which describes a conical distribution plate having a ported central conical section and a ported outer annular conical section, the ports in said central conical section and said annular conical section being circumferentially offset so as to provide a substantial deflecting surface on said central section extending to the ports in the annular section.

Other conical shapes of the distribution plate are for example described in U.S. Pat. No. 4,518,750, hereby incorporated by reference, which describes a distributor of fluidization gases which comprises a double cone body consisting of: (a) a lower conical element, arranged with the vertex turned downwards, provided with more than two ribs on the lateral surface, said ribs having such a profile as to form, together with the wall of the containing shell, flow channels with a decreasing cross-section in an upward direction so that the velocity of the gas will increase gradually and correspondingly, the ribs being arranged diametrically opposite to each other with an axial symmetry and with an inclination with respect to the vertical such as to impart to the inflowing gas current a tangential component, the profile and inclination of the ribs being such as to allow the passage of the solid particles entrained by the inflowing gas, and so as to hinder the falling back of the particles of the fluidized bed whenever the feeding in of the gas is interrupted; and of (b) an upper conical element, with its vertex turned upwards, superimposed onto the lower conical element and having the function of activating the circulation of the solid in the fluidized bed, eliminating the dead or stagnation zones, said process being further characterized in that the distributor in the fluid bed reactor in which it is carried out comprises devices for recycling of the gas, which distributor and the recycling devices allow the passage of the solid particles of the fluidized material entrained by the recycling gas.

For example, U.S. Pat. No. 5,143,705, hereby incorporated by reference, describes a conical distribution plate with its apex pointing upwardly, wherein said conical distribution plate has a plurality of openings.

For example, U.S. Pat. No. 7,226,565B2, hereby incorporated by reference, discloses a distribution plate having a plurality of gas flow orifices whose outlet sides are sidened conically, said outlet sides being wider than the inlet sides.

For example U.S. Pat. No. 5,627,243, hereby incorporated by reference, discloses a cap-like low control elements formed by a cone with a surface of revolution having its tip pointed upward. The conical surface of the flow control element is provided with perforation which is arranged substantially evenly divided on all side surfaces of the element.

For example, U.S. Pat. No. 5,381,827 discloses a gas distributor for use in a gas phase polymerization apparatus having an agitator in a fluidized bed polymerization reactor, the gas distributor being characterized in that the distributor has holes each covered with a cap from above, the cap having an opening oriented in a substantially horizontal direction at an angle of about 90 to 135° with, and outwardly of, a tangent to a circle centered about the center of the reactor.

Preferably, in the invention, the distribution plate comprises a conical shape.

In addition to the distribution plate, the reactor may be further equipped with other means for agitation, such as mechanical agitation, for example a stirrer. Preferably, the reactor does not comprise mechanical agitation.

For the avoidance of doubt the term 'fluids' encompasses liquids, gases and mixtures thereof, wherein the term 'liquids' includes liquids containing solid particles, such as slurries.

The fluids may be cooled to below the dew point of the fluids using any suitable cooling means. For example, cooling of the fluids may be performed using a cooling unit.

The dew point may be increased by increasing the operating pressure of the fluids and/or by increasing the percentage of condensable fluids and simultaneously decreasing the percentage of non-condensable gases in the fluids.

Introduction of the bottom recycle stream under the distribution plate may be done using any suitable means for introducing fluids, for example using injection nozzles.

By separating the liquid stream from the bottom recycle stream, a remaining gas/liquid stream will be passed from below the distribution plate (the first zone (1) in case of the multi-zone reactor) through the distribution plate (6) into the zone above the distribution plate (the second zone (2) in case of the multi-zone reactor). The separated liquid stream to which the solid catalyst (20) is fed will become a slurry stream comprising a prepolymer and/or polymer which is fed to the area above the distribution plate, preferably into the fluidized bed, where the prepolymer and/or polymer will be converted into the polyolefin in the upper part of the reactor (the second and/or the third zone in case of the multi-zone reactor). Heat generated by the polymerization will cause the liquids in the fluids to evaporate. Polyolefin (30) is withdrawn from the (multi-zone) reactor (8). Unreacted fluids are recirculated from the top of the multi-zone reactor (8) to the first zone (1). The one or more olefin monomers and other fluids, such as hydrogen, an inert gas or liquid, for example a condensable non reactive monomer, may be added to the unreacted fluids to make up for reacted fluids before cooling the fluids to below the dew point of the fluids to form a bottom recycle stream.

With integral separator is meant a separator that is located inside the multi-zone reactor. The integral separator is located under the distribution plate.

An example of an integral separator includes a hydrocyclone, a cyclone, wet scrubber and a centrifuge, any of which may optionally be combined with a flow deflector and/or a spinner. In such separator, due to the centrifugal effect, the bottom recycle stream is forced to further condense, thereby increasing the liquid weight fraction.

Preferably, a hydrocyclone is used. Hydrocyclones are commercially available.

The integral separator may achieve separation by using one or more baffles, for example which baffles are placed near the point of introduction of the bottom recycle stream into the multi-zone reactor. The presence of said baffle or baffles causes (at least part of the) condensed liquid in the bottom recycle stream to coalescent in the form of liquid droplets on the baffles, which droplets will then subsequently fall to the bottom part of the reactor (8) by gravity.

Therefore, in one embodiment of the invention, the integral separator (9) comprises one or more baffles.

The integral separator may have a volume of between 20 and 80 m$^3$. Preferably, the diameter of the integral separator is the same as the diameter of the distribution plate, for example, a diameter of up to 5 m, for example a diameter in the range from 2 to 4, for example in the range from 2 to 3 m.

Preferably, the integral separator comprises a demister. Demisters are well known in the art.

Preferably, the integral separator further comprises a liquid reservoir in the bottom of the integral separator for collection of the liquid phase (the bottom of the integral separator is (located in) the bottom of the reactor). The liquid reservoir enables the liquid to be collected thereby providing control over the discharge of the liquid from the integral separator.

Usually, the residence time in the integral separator is low, for example, in the range of 0.1 second to 5 minutes, for example from 1 second to 1 minute.

Preferably, the integral separator is a hydrocyclone, cyclone or a wet scrubber, each of which may optionally be combined with a flow deflector and/or spinner, preferably the integral separator is a hydrocyclone.

The liquid phase is fed to an external pipe, preferably using a pump, preferably a slurry pump. This external pipe preferably has a diameter of from 2 to 20% of the largest diameter of the multi-zone reactor.

In a special embodiment, the external pipe may comprise a loop reactor. A loop reactor as defined herein is a pipe having a diameter of for example at least 10 cm, for example at least 25 cm and a length of for example at least 15 m, for example a length of around 75 m, which is arranged in the form of a loop. In case of the present invention, when the external pipe comprises a loop reactor, the external pipe may be divided into two pipes that are each independently connected the inlet and the outlet of the loop reactor. The loop reactor may be equipped with a cooling jacket, for example a cooling jacket using water as coolant. The liquid phase/liquid stream comprising (pre)polymer may be pumped around in the loop reactor at a high velocity, for example a velocity of from 6 to 10 m/s, for example using an inline axial pump. The loop reactor preferably has a high surface to volume ratio, which facilitates heat transfer and permits short residence times. The loop reactor may comprise any number of pipes, for example two, four or six pipes (multi-leg loop reactor), which pipes may be placed in the vertical direction or in the horizontal direction. Preferably, there is no separation between the pipes. The rate of circulation in the loop reactor may for example be in the range from 30 to 2500 times/h. Preferably, the pipes of the loop reactor are placed in the vertical direction. In the process of the invention, the catalyst may be fed into the loop reactor.

The external pipe may for example have a length of at least 10 m and for example a diameter in the range of from 2 to 20%, for example from 5 to 15%, for example from 5 to 10% relative to the largest diameter of the multi-zone reactor (8). For example, the largest diameter of the multi-zone reactor (8) may be in the range from 4 to 12 m and the diameter of the external pipe may for example be in the range from 10 to 80 cm.

The solid polymerization catalyst may be fed to the external pipe for example by using feeding means, for example using a pump or another injection means. The solid polymerization catalyst may be injected into the external pipe as a dry catalyst, but is preferably injected as a wet solid polymerization catalyst (that means a catalyst in a slurry form).

This is illustrated in FIGS. 1-7 as catalyst feed (20').

The solid polymerization catalyst may for example be fed as a suspension in a solvent, for example a hydrocarbon solvent or the like, or in an inert gas, such as nitrogen or may be fed in the form of a prepolymer.

With prepolymer as used herein is meant a polymer wherein the weight ratio of polymer to solid polymerization particle onto which it is attached is below 3000 g polymer/g solid polymerization catalyst.

In the processes and reaction system of the invention, in the external pipe, polymers will be formed on the solid polymerization catalyst particles.

Generally, the prepolymer formed in the processes and reaction system of the invention will contain less than 1500 g polymer/g solid polymerization particle, for example less than 150 g polymer/g solid polymerization particle, preferably the prepolymer formed in the processes and reaction system of the invention will contain from 5 to 250 g polymer/g solid polymerization particle.

In addition to feeding the solid polymerization catalyst to the external pipe, the catalyst may additionally be fed to the reactor at another position. For example, the catalyst may be included in another feed to the reactor, for example in the feed (60) or in the feed (70) or it may be fed to the reactor directly. For example, the solid polymerization catalyst may be fed at any position into the reactor, for example in the area above the distribution plate or at a combination of positions, but preferably, in case of the multi-zone reactor, it is fed to the second zone (2), preferably to the bottom part of the second zone (2) (indicated in the figures as 2A).

For instance, in case of the multi-zone reactor as described herein, the solid polymerization catalyst may also be injected into the second zone (2) as a dry catalyst.

The person skilled in the art is aware of which solid polymerization catalysts are suitable for continuous polymerization of α-olefin monomers.

For example, heterogeneous polymerization catalysts, which are catalysts that are supported on an inert substrate, for example silica or alumina may be used. Suitable examples of heterogeneous catalysts include supported Ziegler Natta and supported metallocene catalysts and combinations thereof, for example in a mixed catalyst system. Examples of a catalyst composition for polymerization of α-olefins comprising at least two catalytic components are for example described in EP1764378A1, hereby incorporated by reference. EP1764378A1 discloses a catalyst composition comprising a metallocene component and a Ziegler-Natta type transition metal component, at least one activator and support material. Metallocene catalysts are for example described by Hamielec and Soares in "Polymerisation reaction engineering-metallocene catalysts" (Prog. Pol. Sci. Vol. 21, 651-706, 1996), hereby incorporated by reference. The solid polymerization catalyst may also be a metal oxide catalyst, for example a chromium oxide catalysts. Such metal oxide catalyst may for example be based on a support of an inert substrate, for example on silica, alumina silicate or alumina, for example on a highly porous support of silica, alumina silicate or alumina as for example disclosed in the "Handbook of Polyethylene" by Andrew Peacock at pages 61-62, hereby incorporated by reference.

The group of metallocene catalysts includes many variations. In the most general form, metallocene catalysts comprise a metal atom, for example titanium, zirconium or hafnium attached to for example four ligands, for example two substituted cyclopentadienyl ligands and two alkyl, halide or other ligands with an optionally modified organoalumoxane as activator, for example methylaluminoxane (MAO) or a compound based on boron. Examples of inert substrates that can be used as support for a metallocene catalyst include inorganic oxides, for example $SiO_2$, $MgCl_2$, $Al_2O_3$, $MgF_2$ and $CaF_2$. Preferably, the solid polymerization catalyst used in the system and process of the invention is a metallocene catalyst supported on silica, for example a silica as commercially available, for example Grace Davison 948 silica or Ineos ES 70 silica.

A Ziegler Natta catalyst may be used together with a cocatalyst in the system and process of the invention. Suitable example of cocatalysts include but are not limited to organo aluminium compounds having formula $AlR_3$, wherein R stands for a hydrocarbon having 1 to 10 C-atoms. Examples of organo aluminium compounds having formula $AlR_3$ include triethylaluminium alkyl, triisobutyl aluminium trialkyl, tri-n-hexyl aluminium and tri octyl aluminium.

Examples of inert substrates that can be used as support for a Ziegler Natta catalyst include inorganic oxides, for example oxides of silica, alumina, magnesium, titanium and/or zirconium; magnesium chloride, clays, zeolites, polystyrene, polyethylene, polypropylene, graphite and/or layered silicates.

It will be clear to the person skilled in the art, that also mixtures of solid polymerization catalysts may be used in the invention. It will also be clear to the person skilled in the art, that also prepolymer may be used as solid polymerization catalyst.

Upon introduction of the slurry stream into the reactor, the prepolymer and/or polymer may be present in the liquid stream in an amount of for example at least 0.01, for example at least 0.05, for example at least 0.1, for example at least 1 and/or for example at most 99, for example at most 90, for example at most 70, for example at most 60, for example at most 50, for example at most 40, for example at most 30, for example at most 25% by weight based on the total slurry stream upon introduction of the slurry stream into the reactor.

Preferably, the amount of prepolymer and/or polymer present in the liquid stream is from 1 to 30% by weight based on the total slurry stream upon introduction of the slurry stream into the reactor.

The slurry stream comprising the prepolymer and/or polymer is fed into the reactor above the distribution plate, preferably directly into the fluidized bed. The slurry stream may be fed at any position into the fluidized bed, but is preferably fed into the lower part of the fluidized bed.

In a preferred embodiment, the reactor is a multi-zone reactor suitable for the continuous fluidized bed polymerization of one or more α-olefin monomers of which at least one is ethylene or propylene, which multi-zone reactor is operable in condensed mode, which multi-zone reactor comprises a first zone, a second zone, a third zone, a fourth zone and a distribution plate,
wherein the first zone is separated from the second zone by the distribution plate,
wherein the multi-zone reactor is extended in the vertical direction
wherein the second zone of the multi-zone reactor is located above the first zone and
wherein the third zone of the multi-zone reactor is located above the second zone,
and wherein the fourth zone of the multi-zone reactor is located above the third zone
wherein the second zone contains an inner wall, wherein at least part of the inner wall of the second zone is either in the form of a gradually increasing inner diameter or a continuously opening cone, wherein the diameter or the opening increases in the vertical direction towards the top of the multi-zone reactor
wherein the third zone contains an inner wall, wherein at least part of the inner wall of the third zone is either in the form of a gradually increasing inner diameter or a continuously opening cone, wherein the diameter or the opening increases in the vertical direction towards the top of the multi-zone reactor
wherein the largest diameter of the inner wall of the third zone is larger than the largest diameter of the inner wall of the second zone.

In some embodiments, the reactor of the invention may thereby preferably comprise at least a part of said second zone and/or said third zone contains an inner wall, wherein at least part of the inner wall has a cylindrical shape. The inner wall of the reactor may be the inner envelope delimiting the reactor.

In the context of the present invention, a gradually increasing diameter may for example mean an increase of the diameter of the inner wall of the reactor in the vertical direction towards the top of the reactor. Said increase may be for example stepwise, constant, logarithmic or exponential. One example of such is a continuously opening cone In the context of the present invention, a continuously opening cone may for example mean a conically shaped part of the inner wall of the reactor comprising a first circular opening and a second circular opening connected via the inner wall of the reactor, in which the derivative of the diameter variation of the wall as measured in the vertical direction towards the top of the reactor may preferably have a constant and positive value.

In some embodiments of the invention, the zone, preferably for example the second zone, in the area directly above the distribution plate is either in the form of a gradually increasing inner diameter or a continuously opening cone. In the context hereof, directly above may for example mean that a zone in the form of a gradually increasing inner diameter or a continuously opening cone, wherein the diameter or the opening increases in the vertical direction towards the top of the multi-zone reactor is located relative to the distribution plate, so that accumulation of liquids on the surface of the distribution plate may preferably be prevented.

A special advantage of the invention may be that it is possible to produce the polyolefin in the same multi-zone reactor, without intermediate separation of the products obtained in the different zones. This as opposed to the reaction systems known so far that contain multiple unit operations and require separation steps in between the units. Therefore, the invention provides the possibility of shorter cycle times for the production of the polyolefin and is easier to operate.

With 'multi-zone reactor suitable for the continuous polymerization of one or more α-olefin monomers of which at least one is ethylene or propylene' is meant a device capable of containing and controlling the polymerization of the one of more α-olefin monomers and which device can comprise a fluidized bed. The multi-zone reactor of the invention is preferably closed off at the top and the bottom by a hemisphere.

With 'fluidized bed' as used herein is meant that an amount of solid particles (in this case preferably the solid catalyst and/or the solid catalyst to which one or more α-olefin monomers of which at least one is ethylene or propylene is attached) in a solid/fluid mixture acts as a fluid. This can be achieved by placing the amount of solid particles under appropriate conditions, for instance by the introduction of fluid through the solid particles at a high enough velocity to suspend the solid particles and causing them to behave as a fluid.

The first zone of the multi-zone reactor is separated from the second zone by a distribution plate, and is located below the second zone of the multi-zone reactor.

In the first zone, a separation and distribution of the gas and liquid may take place, which is the primary function of the first zone. The first zone may further comprise a flow deflector associated with the entry conduit for providing the bottom recycle stream to prevent the accumulation of solids and liquids in the first zone. Such flow deflector is for example described in (the figures of) U.S. Pat. No. 4,933,149, hereby incorporated by reference.

The second zone contains an inner wall, wherein at least part of the inner wall of the second zone is either in the form of a gradually increasing inner diameter or a continuously opening cone, wherein the diameter or the opening increases in the vertical direction towards the top of the multi-zone reactor. This leads to a variation of the superficial gas velocity at least in a part of the second zone, since superficial gas velocity depends on the circular cross-sectional surface inside of the reactor. This allows to reduce superficial gas velocity in the vertical direction towards the top of the multi-zone reactor, so that the average residence time of polymer particles in the second zone can be increased as a result.

The continuously opening cone or gradually increasing inner diameter of the second zone is preferably located in the lower part of the second zone, more preferably is located directly above the distribution plate.

The second zone may comprise (part of) the fluidized bed where gas phase or gas-liquid polymerization may take place. The second zone is suitable for gas-liquid polymerization (under turbulent fluidization conditions). Turbulent fluidization conditions are described in U.S. Pat. No. 6,391,985, hereby incorporated by reference.

In one embodiment of the invention, a gas-liquid polymerization is conducted in the second zone and a gas phase polymerization is conducted in the third zone.

The third zone of the multi-zone reactor is located above the second zone of the multi-zone reactor. The third zone contains an inner wall, wherein at least part of the inner wall of the third zone is either in the form of a gradually increasing inner diameter of a continuously opening cone, wherein the diameter or the opening increases in the vertical direction towards the top of the multi-zone reactor. This leads to a variation of the superficial gas velocity at least in a part of the third zone, since superficial gas velocity depends on the circular cross-sectional surface inside of the reactor. This allows to reduce superficial gas velocity in the vertical direction towards the top of the multi-zone reactor, so that the average residence time of polymer particles in the third zone can be increased as a result.

By using the multi-zone reactor of the invention, in the second zone (2) a gas-liquid polymerization may take place and in the third zone, a gas-phase polymerization may then occur. Therefore, the invention may provide a two-stage polymerization.

The top zone or fourth zone is a disengagement zone (gas expansion zone), designed so that the superficial gas velocity in that zone preferably hinders polymer particles to reach and/or stay in that zone. It has the function to disengage the reaction mixture and the polymer product of the reaction. Accordingly, this zone does not function as a reaction zone.

In case of a continuously opening cone or gradually increasing inner diameter, the shape of the third zone may be part of the shape of the second zone as illustrated by FIG. 9 herein. For example, the continuously opening cone or gradually increasing inner diameter may extend from the second into the third zone and optionally also from the third into the fourth zone.

However, the shape of the continuously opening cone or gradually increasing inner diameter of the third zone may also have a shape that is different from the continuously opening cone or gradually increasing inner diameter of the second zone. The continuously opening cone or gradually increasing inner diameter of the third zone may be located in any part of the third zone, for example in the lower or in the upper part of the third zone, but is preferably located in the lower part of the third zone.

The multi-zone reactor in this embodiment of the invention is schematically illustrated in FIG. 9 (FIG. 9).

The third zone may comprise part of the fluidized bed. The third zone is suitable for gas-phase polymerization.

The third zone and the second zone can be distinguished when the multi-zone reactor is operated; however there is no sharp boundary between the second and third zone. Typically, when operating the multi-zone reactor: the second zone will comprise more liquid than the third zone and in the third zone, a gas-phase polymerization will take place.

The top zone of the multi-zone reactor, which is for example the fourth zone of the multi-zone reactor is located above the third zone. The top zone or fourth zone is not intended for gas-phase polymerization, but instead is suitable for gas expansion. It has the function to disengage the reaction mixture and the polymer product of the reaction. Accordingly, this zone does not function as a reaction zone. The superficial gas velocity is of such low value that polymer particles preferably do not enter into the top zone, preferably at least so that the top recycle stream is sufficiently free of particles to avoid clogging to occur in the compressor.

In such multi-zone reactor, during the course of polymerization, fresh polymer particles are produced by catalytic polymerization of α-olefin monomers. Such polymer particles are projected upwards in the direction of the fourth zone through the circulating gas. Most of these particles do preferably not reach the fourth zone or return to the second or third zone by gravity as the superficial gas velocity decreases in the fourth zone. The fourth zone may be connected to the third zone or optional further zone(s).

The multi-zone reactor (8) of the invention may comprise further zones, such as for example one, two or even optionally three further zones, that can for example be a fifth zone and optionally a sixth zone and optionally even a seventh zone. These zones may provide a further possibility for polymerization, wherein each further zone may be operated at different reaction conditions. These further zones can be located preferably between the third zone and the top zone.

With inner diameter is meant the diameter in a given horizontal plane perpendicular to the center line of the multi-zone reactor as measured from the inside of the inner wall of the multi-zone reactor. The center line (9) is illustrated in FIG. 9

For example, the maximum inner diameter of the fourth zone is at least 1, for example at least 3, for example at least 5% and/or for example at most 300%, for example at most 200%, for example at most 150%, for example at most 80%, for example at most 70%, for example at most 60%, for example at most 50%, for example at most 40%, for example at most 30%, for example at most 25%, for example at most 20%, for example at most 15% larger than the maximum inner diameter of the third zone. For example, the maximum inner diameter of the fourth zone is from 5 to 30% larger than the maximum inner diameter of the third zone.

For example, the maximum inner diameter of the third zone is at least 1, for example at least 3, for example at least 5% and/or for example at most 300%, for example at most 200%, for example at most 150%, for example at most 80%, for example at most 70%, for example at most 60%, for example at most 50%, for example at most 40%, for example at most 30%, for example at most 25%, for example at most 20%, for example at most 15% larger than the maximum inner diameter of the second zone. For example, the maximum inner diameter of the third zone is from 15 to 30% larger than the maximum inner diameter of the second zone.

For example, the maximum inner diameter of the second zone is at least 1, for example at least 3, for example at least 5% and/or for example at most 300%, for example at most 200%, for example at most 150%, for example at most 80%, for example at most 70%, for example at most 60%, for example at most 50%, for example at most 40%, for example at most 30%, for example at most 25%, for example at most 20%, for example at most 15% larger than the maximum inner diameter of the first zone. For example, the maximum inner diameter of the second zone is from 15 to 30% larger than the maximum inner diameter of the first zone.

In one embodiment, the invention relates to the reactor of the invention, wherein at least the bottom part of the third zone comprises an inner wall in the form of a gradually increasing inner diameter or a continuously opening cone, wherein the diameter or the opening increases in the vertical direction towards the top of the multi-zone reactor. In this embodiment, the bottom part of the second zone and/or of the bottom part of the fourth zone may also comprise an inner wall in the form of a gradually increasing inner diameter or a continuously opening cone, wherein the diameter or the opening increases in the vertical direction towards the top of the multi-zone reactor.

In one embodiment, as illustrated by FIG. 10 the zone (2) in the area directly above the distribution plate is either in the form of a gradually increasing inner diameter or a continuously opening cone (2A), wherein the diameter or the opening increases in the vertical direction towards the top of the multi-zone reactor and wherein the top part of the second zone has an inner wall having a cylindrical shape (2B) and wherein the top part of the second zone is connected to a bottom part of the third zone (3A), wherein the bottom part of the third zone is either in the form of a gradually increasing inner diameter or a continuously opening cone, wherein the diameter or the opening increases in the vertical direction towards the top of the multi-zone reactor and wherein the top part of the third zone has an inner wall having a cylindrical shape (3B) and wherein the top part of the third zone is connected to the top zone, for example to the fourth zone.

Therefore, preferably. zone (2) in the area directly above the distribution plate is either in the form of a gradually increasing inner diameter or a continuously opening cone (2A), wherein the diameter or the opening increases in the vertical direction towards the top of the multi-zone reactor and wherein the top part of the second zone has an inner wall having a cylindrical shape (2B) and wherein the top part of the second zone is connected to a bottom part of the third zone (3A), wherein the bottom part of the third zone is either in the form of a gradually increasing inner diameter or a continuously opening cone, wherein the diameter or the opening increases in the vertical direction towards the top of the multi-zone reactor and wherein the top part of the third zone has an inner wall having a cylindrical shape (3B) and wherein the top part of the third zone is connected to the top zone, for example to the fourth zone.

Preferably, the cylindrical shape is the shape of a right circular cylinder.

Preferably, the angle ($\alpha$) of the inner wall of the part of the second zone having the gradually increasing inner diameter or having the continuously opening cone, relative to the centre line (9) of the multi-zone reactor (8) is from 0.1 to 80 degrees, preferably from 1 to 60 degrees, more preferably from 1-45 degrees, most preferably around 27 degrees.

For example, said angle ($\alpha$) is at least 5, for example at least 7, for example at least 10 degrees, for example at least 20 degrees and/or for example at most 60, for example at most 50, for example at most 40, for example at most 35 degrees, for example at most 30 degrees. For example, the angle ($\alpha$) is in the range from 10 to 40 degrees.

Preferably, the invention relates to a reactor of the invention, wherein the angle ($\alpha$) of the inner wall of the part of the third zone having the gradually increasing inner diameter or having the continuously opening cone, relative to the centre line (9) of the multi-zone reactor (8) is from 0.1 to 80 degrees, preferably from 1 to 60 degrees, more preferably from 1-45 degrees, most preferably around 27 degrees, for example from 1 to 40 degrees.

For example, said angle ($\alpha$) is at least 5, for example at least 7, for example at least 10 degrees, for example at least 20 degrees and/or for example at most 60, for example at most 50, for example at most 40, for example at most 35 degrees, for example at most 30 degrees. For example, the angle ($\alpha$) is in the range from 10 to 40 degrees.

It should be appreciated by the skilled person that due to the fact that the volume in the multi-zone reactor of the invention expands from the first zone to the second zone and from the second zone to the third zone and from the third zone to the fourth zone when operating the multi-zone reactor, the superficial gas velocities in these zones will decrease from the first to the second and from the second to the third zone and from the third zone to the fourth zone. For example, the superficial gas velocities in the multi-zone reactor of the invention, for example when used to produce polyethylene, for example LLDPE, may be in the range of from 0.7 to 3.5 m/s, which may then be reduced to 0.5 to 2 m/s in the third zone, after which the superficial gas velocity may be further reduced in the top zone.

In the invention, the slurry stream is preferably introduced into the part of the second zone wherein the inner wall is either in the form of a gradually increasing inner diameter or a continuously opening cone or into the part of the third zone wherein the inner wall is either in the form of a gradually increasing inner diameter or a continuously opening cone.

Preferably. the bottom recycle stream is introduced in a direction that is substantially tangential to the reactor wall.

Due to such tangential introduction, at least a part of the condensed liquid is separated by a 'centrifugal effect' involved in the area under the distribution plate. Furthermore, depending on the type of integral separator used, the centrifugal effect may cause additional condensation of the gas contained in the bottom recycle stream.

In one embodiment of the invention, the zone in the reactor above the distribution plate (in case of the multi-zone reactor, the second zone) is divided into two or more subzones by one or more substantially vertical partition walls, for example a tube, extending from a point located above the distribution plate to a point located below the gas expansion zone (in case of the multi-zone reactor, the fourth zone) preferably such that a dead zone is prevented.

With 'dead zone' is meant a region where the mixing is insufficient for providing homogeneous reaction resulting in either chunking or melting in the dead zone and/or resin that is outside the desired specifications (off spec). Examples of specifications are not limited to desired density, molecular weight, molecular weight distribution and/or melt flow rate.

Such vertical partition walls are sometimes also referred to as 'draft tube'. This is for example described in WO02/40146A1 and in U.S. Pat. No. 6,403,730, both of which are hereby incorporated by reference.

In one embodiment, the reactor further comprises a moving bed unit, wherein the moving bed unit is provided with an inlet and an outlet which are connected to the zone in the reactor above the distribution plate (in case of the multi-zone reactor this is the second zone of the reactor), wherein in said zone shielding means are positioned such that via the outlet of the moving bed unit inflow of gas from said zone is inhibited and outflow of polymerization particles is allowed, wherein preferably the moving bed unit is provided with gas feed means for feeding gas at one or more different levels in the moving bed unit and/or wherein preferably the outlet of the moving bed unit is provided with means for displacing metered quantities of polymer particles from the moving bed unit into the zone above the distribution plate.

US 20100273971, which is hereby incorporated by reference, discloses such moving bed unit (also known as 'draught tube'), wherein the moving bed unit is provided with an inlet and an outlet which are connected to the zone of the reactor above the distribution plate, wherein shielding are positioned such that via the outlet of the moving bed unit inflow of gas from the zone above the distribution plate is inhibited and outflow of polymerization particles is allowed.

Such draught tube is also described in U.S. Pat. No. 8,354,483, hereby incorporated by reference, which discloses that the moving bed unit is provided with gas feed means for feeding gas at one or more different levels in the moving bed unit and preferably wherein the outlet of the moving bed unit is provided with means for displacing metered quantities of polymer particles from the moving bed unit into the zone above the distribution plate.

In order to maintain a fluidized bed in the processes of the invention, the superficial gas velocity is in the range of 0.5 to 5 m/s. For example, is at least 1, for example at least 1.5, for example at least 2 and/or for example at most 4.5, for example at most 4, for example at most 3.5, for example at most 3 m/s.

By feeding the fluids that are cooled to below the dew point of the fluids into the first zone (1), the fluids will be passed from the first zone (1) through the distribution plate (6) into the second zone (2), resulting in the formation of a fluidized bed and/or a bubble column. Heat generated by the polymerization will cause the liquids in the fluids to evaporate. The feeding of the solid polymerization catalyst and the one or more α-olefin monomers to the multi-zone reactor (8) will result in the formation of polyolefin (30), which is withdrawn from the multi-zone reactor (8). The top recycle stream is recirculated from the top of the multi-zone reactor to the first zone (1). The one or more α-olefin monomers and other fluids, such as hydrogen, an inert gas or liquid, for example a condensable inert component, may be added to the top recycle stream to make up for reacted fluids before cooling the fluids to below the dew point of the fluids to form a bottom recycle stream.

The continuous polymerization of one or more α-olefin monomers will produce polyolefins in the form of particles, herein also referred to as 'polyolefin' (30). Examples of polyolefins which may thus produced, include a wide variety of polymers, for example polyethylene, for example linear low density polyethylene (LLDPE), which may for example be prepared from ethylene and but-1-ene, 4-methylpent-1-ene or hex-1-ene, high density polyethylene (HDPE), which may for example be prepared from ethylene or from ethylene with a small portion of an α-olefin monomer having from 4 to 8 carbon atoms, for example but-1-ene, pent-1-ene, hex-1-ene or 4-methylpent-1-ene. Other examples include but are not limited to plastomers, elastomers, medium density polyethylene, polypropylene homopolymers and polypropylene copolymers, including random copolymers, and block or multi-block copolymer and ethylene propylene rubber (EPR).

Preferably, in the processes of the invention, the polyolefin produced is a polyethylene, for example linear low density polyethylene or high density polyethylene or a homopolypropylene or propylene-ethylene random copolymer.

Depending on their composition, the polyolefins obtained or obtainable by the process of the invention may have several advantages over the polyolefins produced in a reactor different from the reactor of the invention. For example, the impact of polypropylene impact copolymers may be increased, the amount of carbon black in ethylene polymer rubbers (EPR) may be decreased, the molecular weight distribution of polyethylene may be broadened, the homogeneity of the polyolefin may be increased, the residence time distribution may be narrower, the blockiness may be altered, the morphology may be change, the bulk density may be changed etc., Therefore, in another aspect, the invention relates to a polyolefin obtained or obtainable by the processes of the invention.

The figures as used herein are meant to illustrate the invention but is by no means meant to limit the invention thereto.

Figure 1:
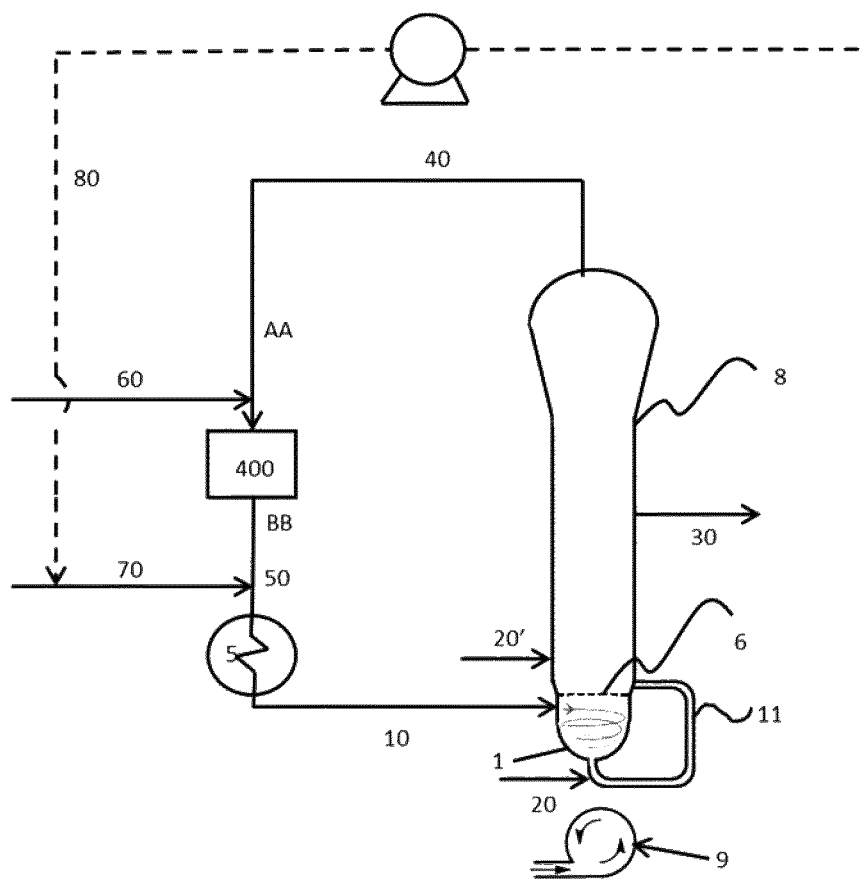
FIG. 1 is a schematic illustration of an embodiment of the reactor system of the invention using a standard gas-phase reactor that is suitable for the continuous polymerization of one or more α-olefin monomers.

In another aspect, the invention relates to a system suitable for the continuous polymerization of one or more α-olefin monomers of which at least one is ethylene or propylene comprising a reactor (8), a compressor (400), a cooling unit (5) and an external pipe (11) for the production of a prepolymer and/or polymer, wherein the reactor comprises a first outlet for a top recycle stream (40)
wherein the system comprises apparatus for condensing the top recycle stream into a bottom recycle stream
wherein the reactor comprises a first inlet for receiving a bottom recycle stream (10), wherein the first inlet for receiving the bottom recycle stream is located underneath the distribution plate (6)
wherein the reactor comprises an integral separator (9) for separation of the bottom recycle stream into a gas/liquid and a liquid phase
wherein the integral separator (9) is located underneath the distribution plate (6)
wherein the first inlet of the integral separator (9) is connected to a first outlet for a liquid phase
wherein the first outlet for the liquid phase is connected to the second outlet of the reactor for the liquid phase
wherein the second outlet of the reactor provides the liquid phase to the first inlet of the external pipe (11)
wherein the external pipe comprises a second inlet for receiving a solid polymerization catalyst (20)
wherein the first outlet of the external pipe is connected to a second inlet of the reactor for receiving a slurry phase comprising the prepolymer and/or polymer
wherein the reactor comprises a third outlet for providing polyolefin (30)
wherein the system comprises a first inlet for receiving a feed (60) and optionally a second inlet for receiving a feed (70).

Preferably, the first inlet for receiving the bottom recycle stream of the reactor may extend in a direction that is substantially tangential to the reactor wall. By having an inlet that is substantially tangential to the reactor wall, the (at least part of the) condensed liquid will be separated by the 'centrifugal effect' involved in the area under the distribution plate (also referred to herein as the first zone in case a multi-zone reactor is present in the reaction system of the invention).

The second outlet of the reactor for the liquid phase in the reaction system of the invention is preferably located at the bottom part of the reactor, that is the first zone (1) in case a multi-zone reactor is used, more preferably at the lowest part of the reactor, that is the lowest part of the first zone (1)|case of the multi-zone reactor.

Preferably, the first inlet of the reactor for receiving a bottom recycle stream (10) is situated not more than 1.5 m below the distribution plate (6). Depending on the type of polymer produced and reaction conditions, such as for example the amount of liquid in the bottom recycle stream, the choice of components of the bottom recycle stream, the optional condensing agent, the temperature of the bottom recycle stream (10) and the presence and concentration of carried over particles in the bottom recycle stream (10), the dimensions of the zone below the distribution plate (in case of the multi-zone reactor the first zone (1)), and the reaction mixture, the optimal place for the first inlet of the reactor (8) may easily be determined by the person skilled in the art through routine experimentation.

Figure 3:
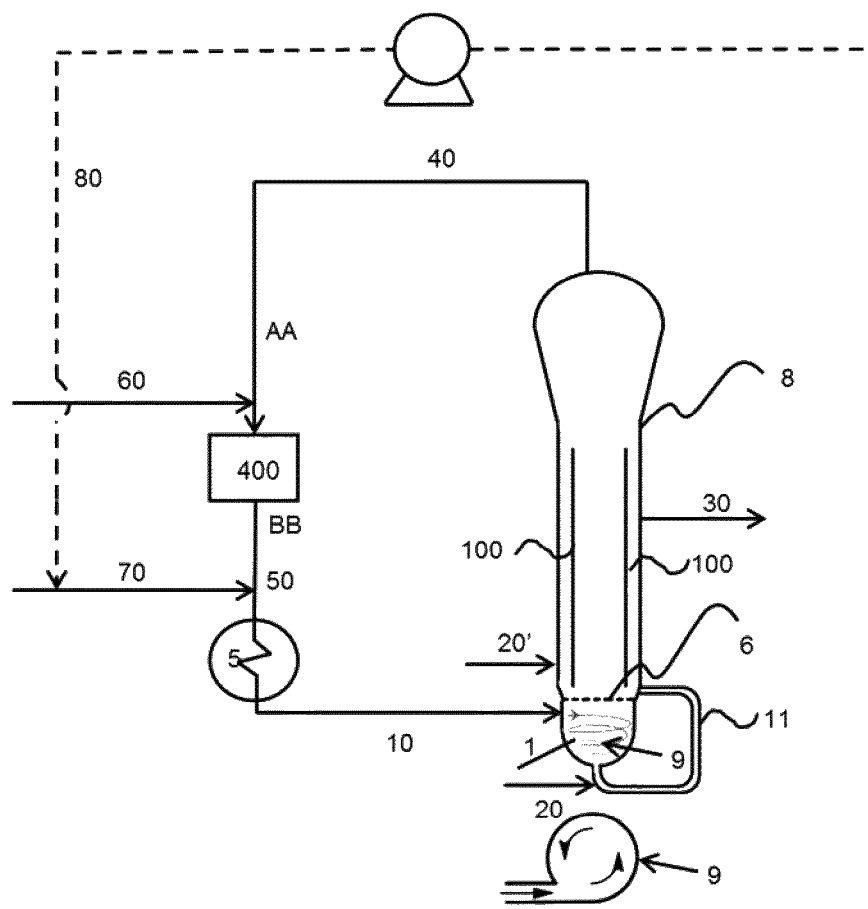
FIG. 3 is a schematic illustration of a reactor system of the invention using the standard gas-phase reactor, wherein a draft tube (100) is present inside the reactor.

A special embodiment of the system of the invention is schematically represented in FIG. 1 without however being limited thereto. The system of FIG. 3 is only one of numerous possible schematic arrangements. Thus, for example, the sequence of the equipment items in the circulated gas line, particularly of the cooler and compressor can also be reversed or further equipment items can be integrated into the line. Further elements such as systems for discharging the product and for metering-in the catalyst are not shown in FIG. 1, such elements are known to those skilled in the art and can be integrated into the reactor in a known manner.

The system of FIG. 1 is a reactor system that suitable for the continuous polymerization of one or more α-olefin monomers of which at least one is ethylene or propylene comprising a reactor (8), a compressor (400), a cooling unit (5) and an external pipe (11) for the production of a prepolymer and/or polymer,
wherein the reactor comprises a first outlet for a top recycle stream (40),
wherein the system comprises apparatus for condensing the top recycle stream into a bottom recycle stream,
wherein the reactor comprises a first inlet for receiving a bottom recycle stream (10), wherein the first inlet for receiving the bottom recycle stream is located underneath the distribution plate (6),
wherein the reactor comprises an integral separator (9) for separation of the bottom recycle stream into a gas/liquid and a liquid phase,
wherein the integral separator (9) is located underneath the distribution plate (6),
wherein the first inlet of the integral separator (9) is connected to a first outlet for a liquid phase,
wherein the first outlet for the liquid phase is connected to the second outlet of the reactor for the liquid phase,
wherein the second outlet of the reactor provides the liquid phase to the first inlet of the external pipe (11),
wherein the external pipe comprises a second inlet for receiving a solid polymerization catalyst (20),
wherein the first outlet of the external pipe is connected to a second inlet of the reactor for receiving a slurry phase comprising the prepolymer and/or polymer,
wherein the reactor comprises a third outlet for providing polyolefin (30),
wherein the system comprises a first inlet for receiving a feed (60) and optionally a second inlet for receiving a feed (70).

In the system of FIG. 1, the first outlet of the reactor is connected to a first inlet of a compressor (400) via a first connection means (AA), for instance pipes
wherein the compressor (400) comprises a first outlet for compressed fluids (50), wherein the first outlet of the compressor (400) is connected to a first inlet for compressed fluids of the cooling unit (5) via a second connection means (BB), wherein optionally the second connection means (BB), for instance pipes, comprises a first inlet for receiving the feed (70),
wherein the cooling unit (5) comprises a first outlet for providing the bottom recycle stream (10) which first outlet of the cooling unit (5) is connected to the first inlet of the reactor, wherein the first connection means (AA) comprises a first inlet for receiving a feed (60).

The system of the invention may further comprise a polymer withdrawal system, a polymer degassing system and a vent gas recovery system (not shown in the figures presented herein). The outlet for the recovered components (in liquid form) (80) from the vent gas recovery system may be connected to the first inlet (70) of the second connection means (BB).

As described above, the optional additional solid polymerization catalyst (indicated with 20' in the figures) may be fed at any position into the reactor, for example in the area above the distribution plate or at a combination of positions, but preferably, in case of the multi-zone reactor, it is fed to the second zone (2), preferably to the bottom part of the second zone (2A).

The feed (60) comprises a chain transfer agent, for example hydrogen and may further comprise gaseous α-olefin monomers and insert gaseous components, for example nitrogen.

The feed (70) comprises condensable inert components, for example a condensable inert component selected from the group of alkanes having 4 to 20 carbon atoms, preferably 4 to 8 carbon atoms, and mixtures thereof, for example propane, n-butane, isobutene, n-pentane, isopentane, neopentane, n-hexane, isohexane or other saturated hydrocarbons having 6 C-atoms, n-heptane, n-octane and other saturated hydrocarbons having 7 or 8 C-atoms and any mixtures thereof; and may further comprise condensable α-olefin monomers, α-olefin comonomers and/or mixtures thereof.

The condensable inert component is preferably selected from the group of isopentane, n-hexane, n-butane, i-butane and mixtures thereof. Because of their more attractive pricing, preferably isopentane and/or n-hexane are/is used as condensable inert component(s) in the feed (70).

When copolymers are produced, the process of the invention further comprises supplying a comonomer using feed (60) or (70) in case of a non-condensable comonomer and using feed (70) in case of a condensable comonomer.

Preferably in the invention, the fluids are cooled to such extent that the amount of liquid in the bottom recycle stream (10) is at least 7% by weight, for example at least 9%, for example at least 14% by weight based on the total amount of liquid and gas. For example, the amount of liquid in the bottom recycle stream is at least 14.5%, for example at least 20%, for example at least 25% and/or for example at most 95%, for example at most 90%, for example at most 90%, for example at most 85%, for example at most 80%, for example at most 75%, for example at most 70%, for example at most 65%, for example at most 60%, for example at most 55%, for example at most 55% by weight based on the total amount of liquid and gas in the bottom recycle stream. Preferably, the amount of liquid in the bottom recycle stream is at least 25% and for example at most 55% by weight based on the total amount of liquid and gas in said bottom recycle stream.

High amounts of liquid in the bottom recycle stream enables feeding of one or more very high activity catalyst system.

In a preferred embodiment, the invention relates to a system of the invention wherein the first outlet of the reactor is connected to a first inlet of a compressor (400) via a first connection means (AA), for instance pipes
wherein the compressor (400) comprises a first outlet for compressed fluids (50), wherein the first outlet of the compressor (400) is connected to a first inlet for compressed fluids of the cooling unit (5) via a second connection means (BB), wherein optionally the second connection means (BB), for instance pipes, comprises a first inlet for receiving the feed (70),
wherein the cooling unit (5) comprises a first outlet for providing the bottom recycle stream (10) which first outlet of the cooling unit (5) is connected to the first inlet of the reactor, wherein the first connection means (AA) comprises a first inlet for receiving a feed (60).

The compressor (400) may be any device that is suitable for compressing the feed (60) and the top recycle stream (40) using the compressor (400) to form the compressed fluids (50). By compressing the feed (60) and the top recycle stream (40), the pressure of the compressed fluids (50) is increased compared to the feed (60) and the top recycle stream (40) before use of the compressor (400).

The cooling unit (5) may be any device that is suitable for cooling the compressed fluids (50) to below the dew point of the compressed fluids to form the bottom recycle stream (10). For example, a heat exchanger may be used as the cooling unit (5).

The top recycle stream (40) contains fluids that are withdrawn from the first outlet of the fourth zone (4) or in case of more than four zones, from the first outlet of the top zone of the (multi-zone) reactor (8).

The first connection means (AA) and the second connection means (BB) can in principle be any means for connecting the first outlet of the fourth zone (4) and the first inlet of the compressor (400) respectively, the first outlet of the compressor (400) and the first inlet of the cooling unit (5).

Preferably, in the system of the invention the external pipe (11) is a loop reactor as described herein.

For example, in the system of the invention, the distribution plate (6) (as described above) comprises a conical shape.

Figure 7:
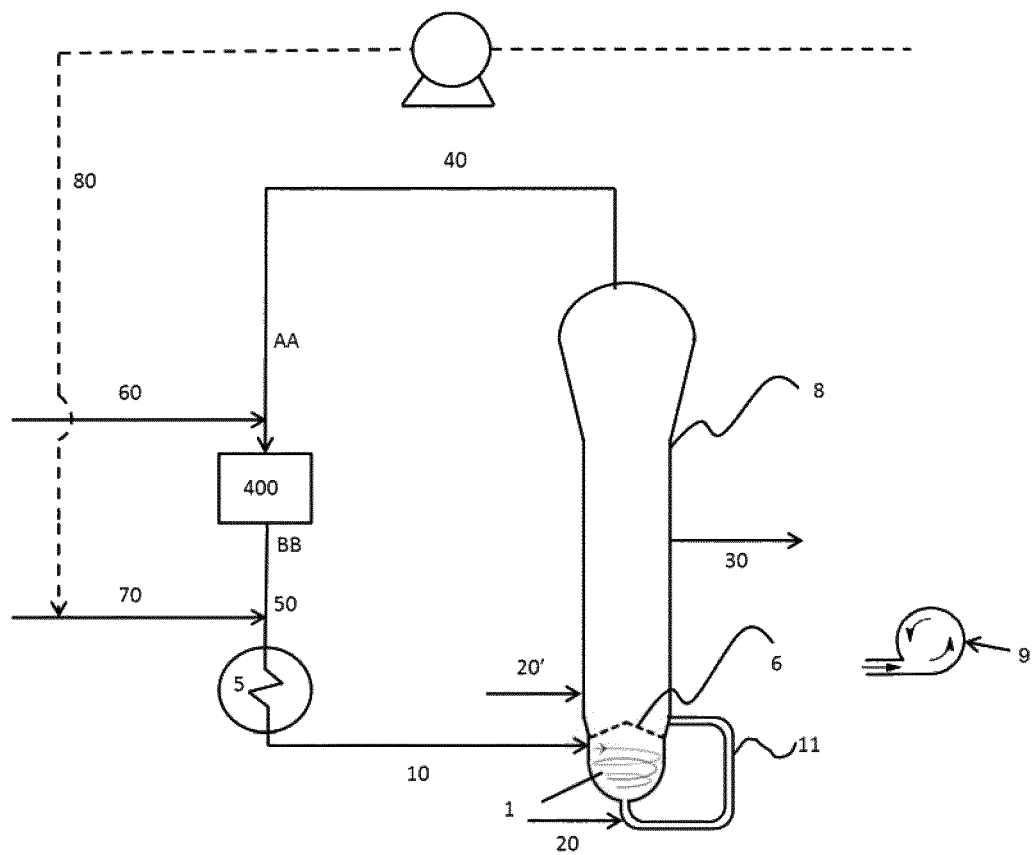
FIG. 7 is a schematic illustration of a reactor system of the invention using the standard gas-phase reactor, wherein the distribution plate (6) comprises a conical shape.
Figure 8:
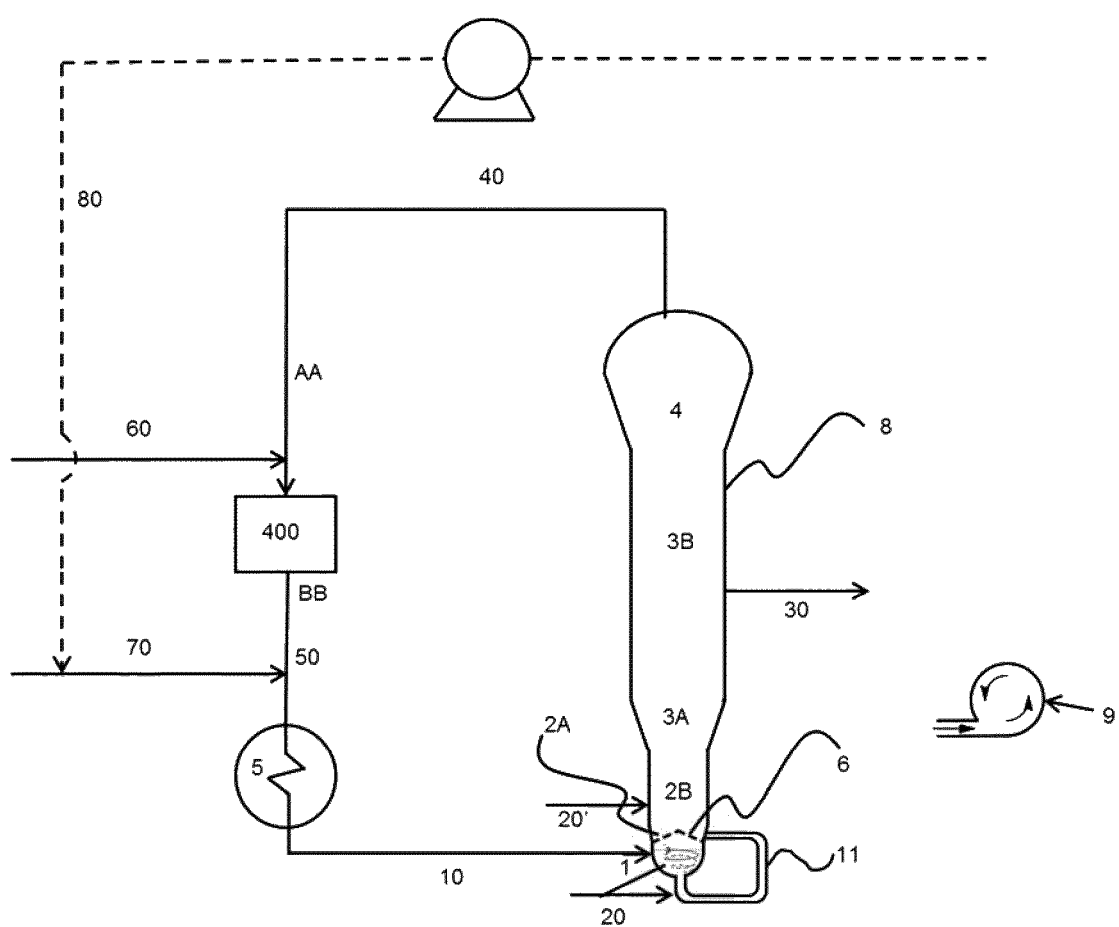
FIG. 8 is a schematic illustration of a reactor system of the invention using the multi-zone reactor, wherein the distribution plate (6) comprises a conical shape.
Figure 9:
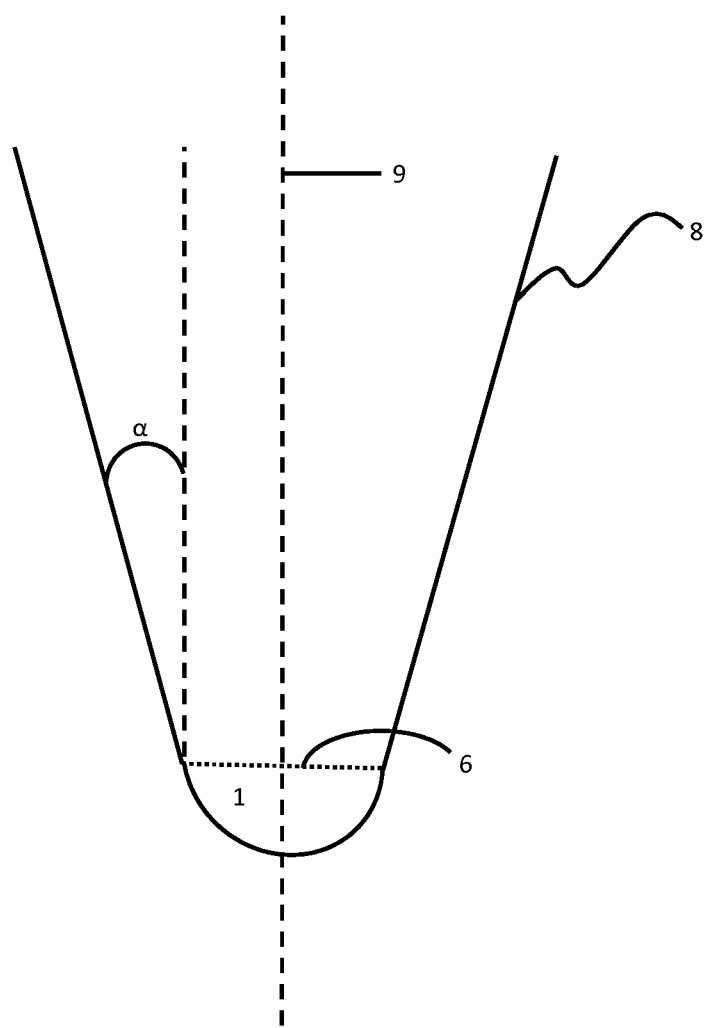
FIG. 9 schematically illustrates one embodiment of the vertical cross-section of the multi-zone reactor.
Figure 10:
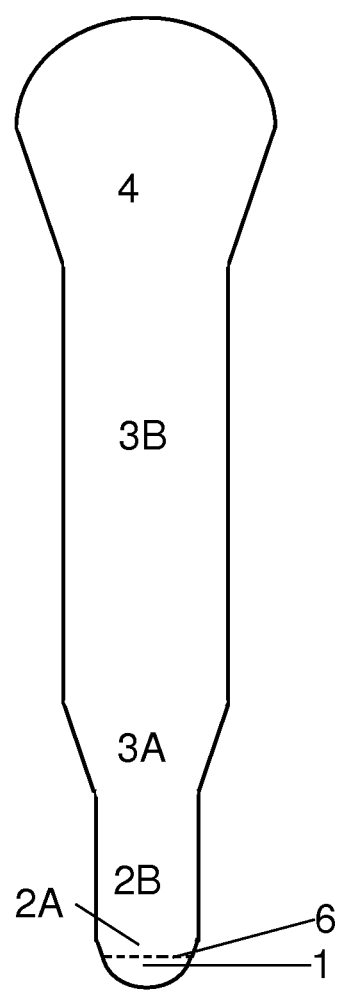
FIG. 10 schematically illustrates one embodiment of the vertical cross-section of the multi-zone reactor.

FIG. 7 is a schematic representation of a reactor system of the invention using the standard gas-phase reactor, wherein the distribution plate (6) comprises a conical shape. FIG. 8 is a schematic representation of a reactor system of the invention using the multi-zone reactor, wherein the distribution plate (6) comprises a conical shape.

In FIG. 7 and in FIG. 8, the apex of the cone points towards the top of the reactor.

In one embodiment of the system of the invention, the zone in the reactor above the distribution plate is divided into two or more subzones by one or more substantially vertical partition walls, for example a tube, extending from a point located above the distribution plate to a point located below the end surface such that a dead zone is prevented. This division into two or more subzones is also referred to herein as 'draft tube'.

Figure 4:
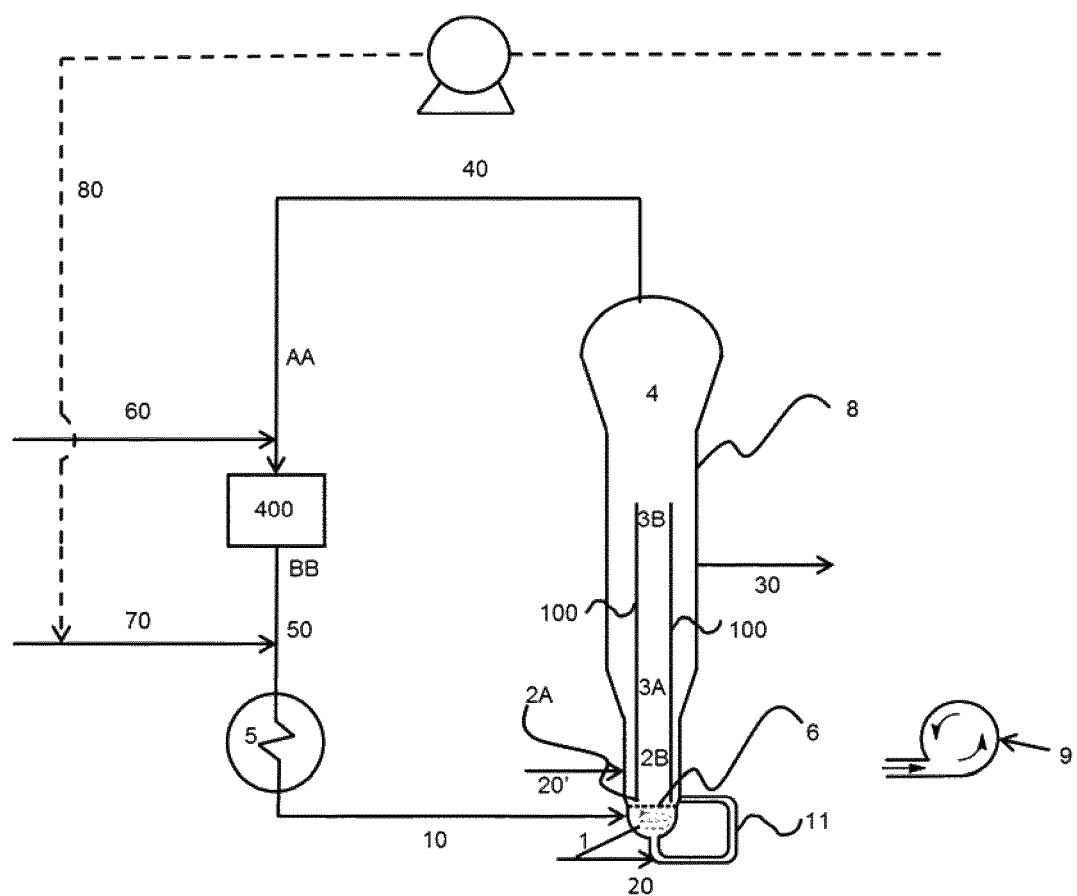
FIG. 4 is a schematic illustration of a reactor system of the invention using a multizone reactor, wherein a draft tube (100) is present inside the reactor.

The system of FIG. 3 is a schematic representation of a reactor system of the invention using the standard gas-phase, wherein a draft tube is present inside the reactor. The system of FIG. 4 uses a multizone reactor instead of the standard gas-phase olefin polymerization reactor as indicated in FIG. 3.

In one embodiment of the system of the invention, the reactor further comprises a moving bed unit, wherein the moving bed unit is provided with an inlet and an outlet which are connected to the zone in the reactor above the distribution plate, wherein in said zone shielding means are positioned such that via the outlet of the moving bed unit inflow of gas from said zone is inhibited and outflow of polymerization particles is allowed, wherein preferably the moving bed unit is provided with gas feed means for feeding gas at one or more different levels in the moving bed unit and/or wherein preferably the outlet of the moving bed unit is provided with means for displacing metered quantities of polymer particles from the moving bed unit into the zone above the distribution plate. This moving bed unit is herein also referred to as 'draught tube'.

Figure 5:
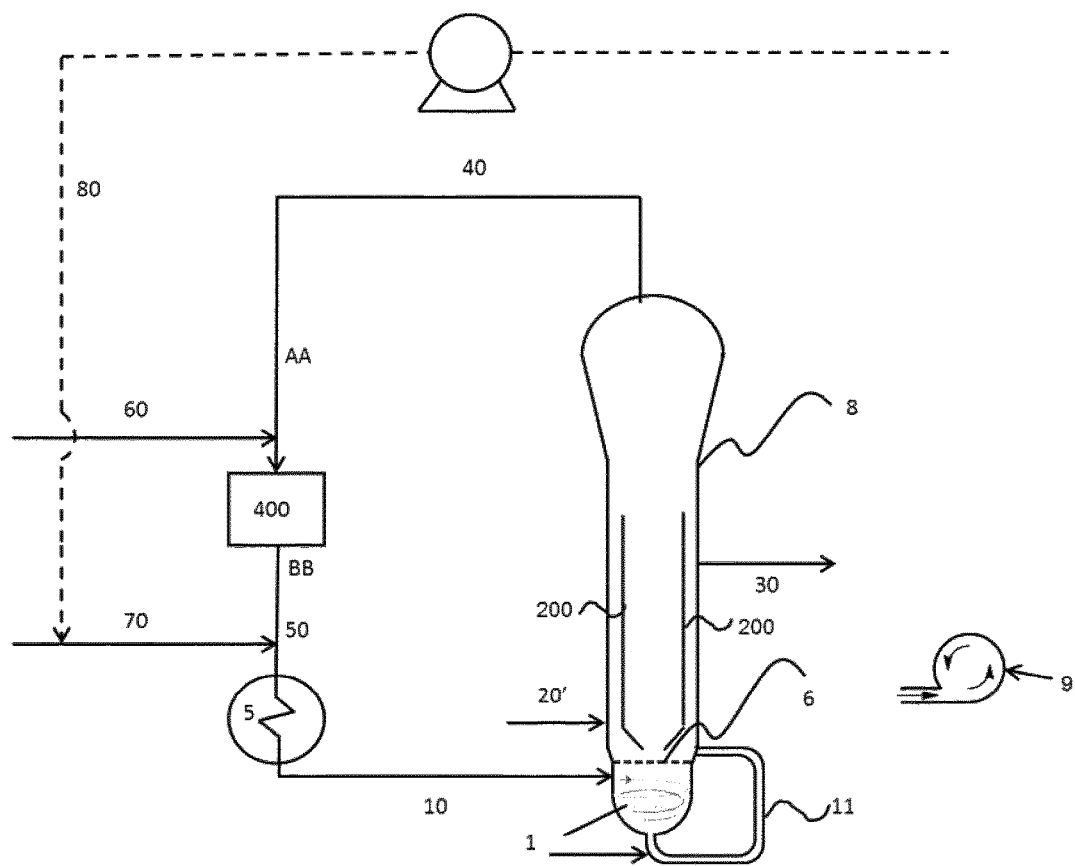
FIG. 5 is a schematic illustration of a reactor system of the invention using the standard gas-phase reactor, wherein a draught tube (200) is present inside the reactor.
Figure 6:
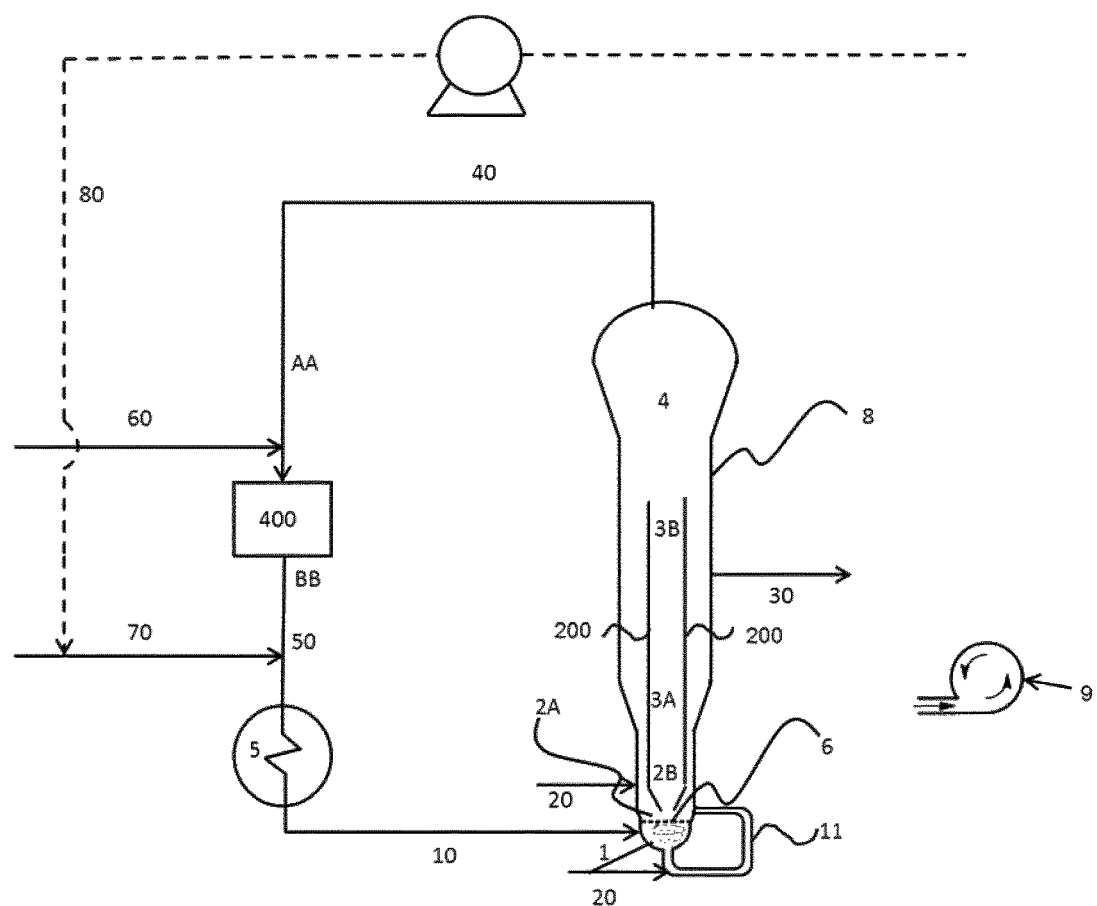
FIG. 6 is a schematic illustration of a reactor system of the invention using a multizone reactor, wherein a draught tube (200) is present inside the reactor.

FIG. 5 is a schematic representation of a reactor system of the invention using the standard gas-phase reactor, wherein a draught tube is present inside the reactor. The system of FIG. 6 uses a multizone reactor instead of the standard gas-phase olefin polymerization reactor as indicated in FIG. 5.

In a special embodiment of the system of the invention, the reactor (8) is a multi-zone reactor suitable for the continuous fluidized bed polymerization of one or more α-olefin monomers of which at least one is ethylene or propylene, which multi-zone reactor is operable in condensed mode, which multi-zone reactor is as described herein, i.e. which multi-zone reactor comprises a first zone, a second zone, a third zone, a fourth zone and a distribution plate,
wherein the first zone is separated from the second zone by the distribution plate,
wherein the multi-zone reactor is extended in the vertical direction
wherein the second zone of the multi-zone reactor is located above the first zone and
wherein the third zone of the multi-zone reactor is located above the second zone,
and wherein the fourth zone of the multi-zone reactor is located above the third zone
wherein the second zone contains an inner wall, wherein at least part of the inner wall of the second zone is either in the form of a gradually increasing inner diameter or a continuously opening cone, wherein the diameter or the opening increases in the vertical direction towards the top of the multi-zone reactor
wherein the third zone contains an inner wall, wherein at least part of the inner wall of the third zone is either in the form of a gradually increasing inner diameter or a continuously opening cone, wherein the diameter or the opening increases in the vertical direction towards the top of the multi-zone reactor
wherein the largest diameter of the inner wall of the third zone is larger than the largest diameter of the inner wall of the second zone.

Figure 2:
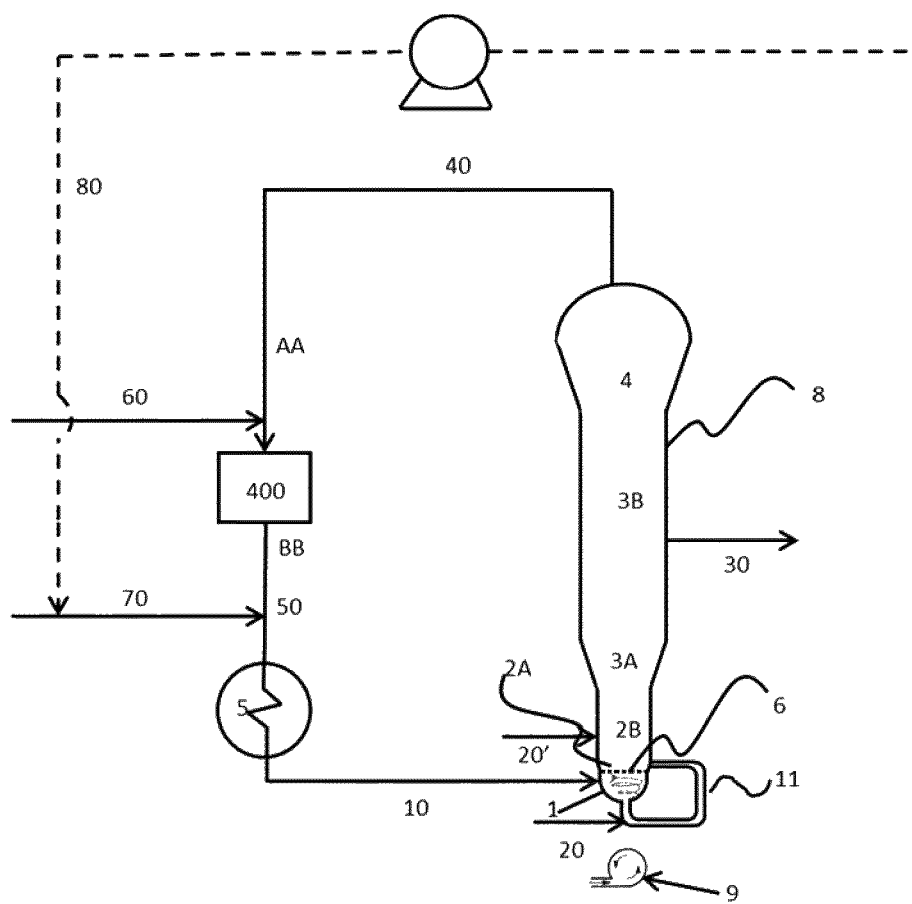
FIG. 2 is a schematic illustration of a reactor system of the invention using a multizone reactor instead of the standard gas-phase reactor.

The system of FIG. 2 is a schematic representation of a reactor system of the invention. Instead of the standard gas-phase olefin polymerization reactor as indicated in FIG. 1, a multizone reactor is used.

Preferably, the second inlet of the reactor for receiving a slurry phase comprising the prepolymer and/or polymer is located in the part of the second zone wherein the inner wall is either in the form of a gradually increasing inner diameter or a continuously opening cone and/or in the part of the third zone wherein the inner wall is either in the form of a gradually increasing inner diameter or a continuously opening cone, preferably wherein the second inlet of the reactor for receiving a slurry phase comprising the prepolymer and/or polymer is located in the part of the second zone wherein the inner wall is either in the form of a gradually increasing inner diameter or a continuously opening cone.

Preferably, in the multi-zone reactor in zone (2) the area directly above the distribution plate is either in the form of a gradually increasing inner diameter or a continuously opening cone (2A), wherein the diameter or the opening increases in the vertical direction towards the top of the multi-zone reactor and wherein the top part of the second zone has an inner wall having a cylindrical shape (2B) and wherein the top part of the second zone is connected to a bottom part of the third zone (3A), wherein the bottom part of the third zone is either in the form of a gradually increasing inner diameter or a continuously opening cone, wherein the diameter or the opening increases in the vertical direction towards the top of the multi-zone reactor and wherein the top part of the third zone has an inner wall having a cylindrical shape (3B) and wherein the top part of the third zone is connected to the top zone, for example to the fourth zone.

Preferably the third outlet of the reactor (30) below the third inlet for receiving the slurry phase comprising the prepolymer and/or polymer is located below the third inlet for receiving the slurry phase.

In case of the multi-zone reactor, preferably, the third outlet of the reactor (30) is located in the second or third zone, more preferably below the third inlet for receiving the slurry phase.

Preferably, the first inlet of the reactor for receiving the bottom recycle stream is substantially tangential to the reactor wall.

Figure 11:
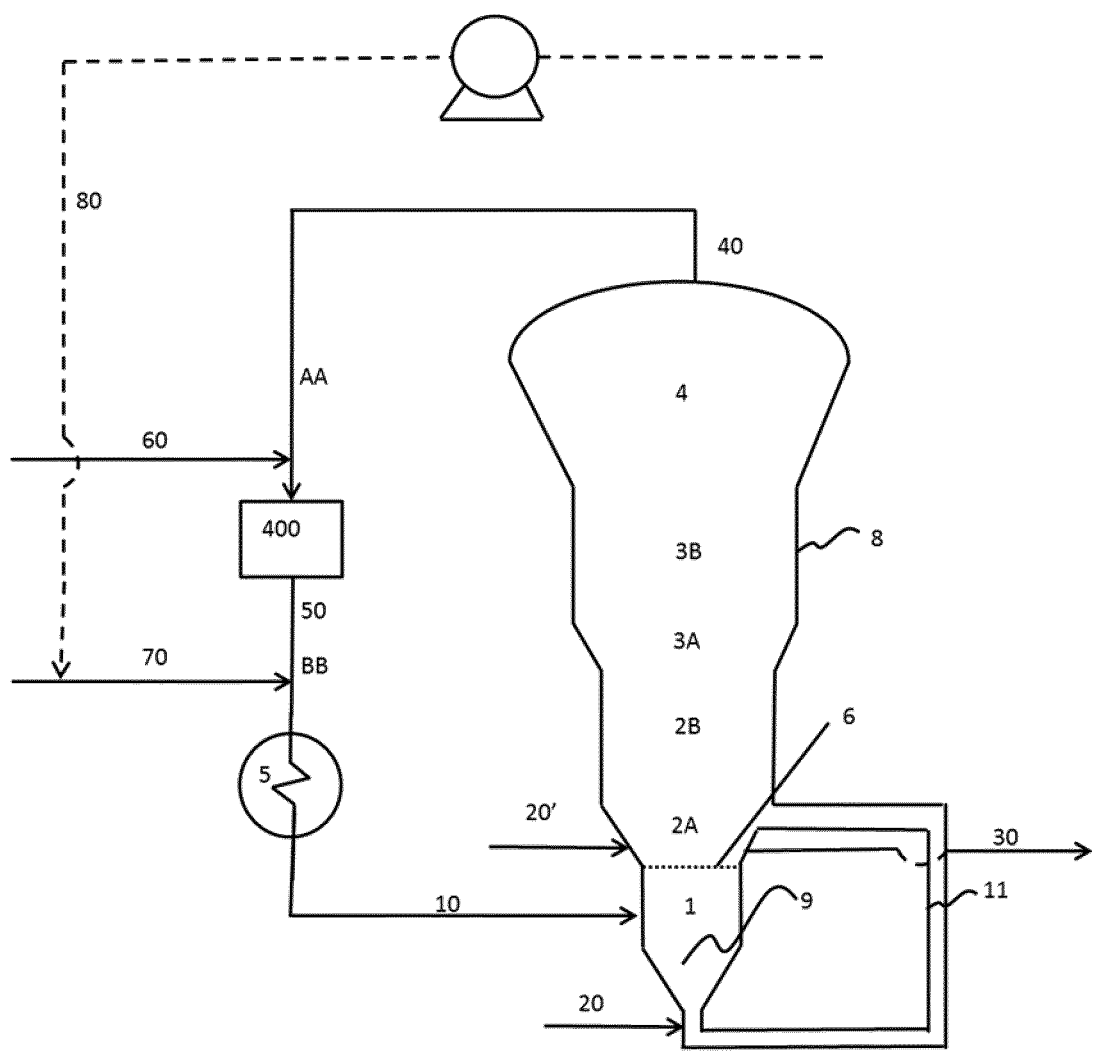
FIG. 11 schematically illustrates a particularly preferred embodiment of the system of the invention, using a multizone reactor.

The system of FIG. 11 is a reactor system that suitable for the continuous polymerization of one or more α-olefin monomers of which at least one is ethylene or propylene comprising a reactor (8), a compressor (400), a cooling unit (5) and an external pipe (11) for the production of a prepolymer and/or polymer,
wherein the reactor comprises a first outlet for a top recycle stream (40),
wherein the system comprises apparatus for condensing the top recycle stream into a bottom recycle stream,
wherein the reactor comprises a first inlet for receiving a bottom recycle stream (10), wherein the first inlet for receiving the bottom recycle stream is located underneath the distribution plate (6),
wherein the reactor comprises an integral separator (9) for separation of the bottom recycle stream into a gas/liquid and a liquid phase,
wherein the integral separator (9) is located underneath the distribution plate (6),
wherein the first inlet of the integral separator (9) is connected to a first outlet for a liquid phase,
wherein the first outlet for the liquid phase is connected to the second outlet of the reactor for the liquid phase,
wherein the second outlet of the reactor provides the liquid phase to the first inlet of the external pipe (11),
wherein the external pipe comprises a second inlet for receiving a solid polymerization catalyst (20),
wherein the first outlet of the external pipe is connected to a second inlet of the reactor for receiving a slurry phase comprising the prepolymer and/or polymer,
wherein the reactor comprises a third outlet for providing polyolefin (30),
wherein the system comprises a first inlet for receiving a feed (60) and optionally a second inlet for receiving a feed (70).
wherein the first outlet of the reactor is connected to a first inlet of a compressor (400) via a first connection means (AA), for instance pipes
wherein the compressor (400) comprises a first outlet for compressed fluids (50), wherein the first outlet of the compressor (400) is connected to a first inlet for compressed fluids of the cooling unit (5) via a second connection means (BB), wherein optionally the second connection means (BB), for instance pipes, comprises a first inlet for receiving the feed (70),
wherein the cooling unit (5) comprises a first outlet for providing the bottom recycle stream (10) which first outlet of the cooling unit (5) is connected to the first inlet of the reactor, wherein the first connection means (AA) comprises a first inlet for receiving a feed (60) wherein the reactor is a multi-zone reactor suitable for the continuous fluidized bed polymerization of one or more α-olefin monomers of which at least one is ethylene or propylene, which multi-zone reactor is operable in condensed mode, which multi-zone reactor comprises a first zone, a second zone, a third zone, a fourth zone and a distribution plate,
wherein the first zone is separated from the second zone by the distribution plate,
wherein the multi-zone reactor is extended in the vertical direction, wherein the second zone of the multi-zone reactor is located above the first zone and
wherein the third zone of the multi-zone reactor is located above the second zone,
and wherein the fourth zone of the multi-zone reactor is located above the third zone,
wherein the second zone contains an inner wall, wherein at least part of the inner wall of the second zone is either in the form of a gradually increasing inner diameter or a continuously opening cone, wherein the diameter or the opening increases in the vertical direction towards the top of the multi-zone reactor,
wherein the third zone contains an inner wall, wherein at least part of the inner wall of the third zone is either in the form of a gradually increasing inner diameter or a continuously opening cone, wherein the diameter or the opening increases in the vertical direction towards the top of the multi-zone reactor,
wherein the largest diameter of the inner wall of the third zone is larger than the largest diameter of the inner wall of the second zone,
wherein zone (2) in the area directly above the distribution plate is either in the form of a gradually increasing inner diameter or a continuously opening cone (2A), wherein the diameter or the opening increases in the vertical direction towards the top of the multi-zone reactor and
wherein the top part of the second zone has an inner wall having a cylindrical shape (2B) and
wherein the top part of the second zone is connected to a bottom part of the third zone (3A),
wherein the bottom part of the third zone is either in the form of a gradually increasing inner diameter or a continuously opening cone, wherein the diameter or the opening increases in the vertical direction towards the top of the multi-zone reactor and wherein the top part of the third zone has an inner wall having a cylindrical shape (3B) and wherein the top part of the third zone is connected to the top zone, for example to the fourth zone,
wherein the third outlet of the reactor (30) is located in the second or third zone, more preferably below the third inlet for receiving the slurry phase,
wherein the feed for the optional additional solid polymerization catalyst (20') is located at the bottom part of the second zone (2A) and
wherein the second inlet of the reactor for receiving a slurry phase comprising the prepolymer and/or polymer is located in the part of the second zone wherein the inner wall is either in the form of a gradually increasing inner diameter or a continuously opening cone and/or in the part of the third zone wherein the inner wall is either in the form of a gradually increasing inner diameter or a continuously opening cone, preferably wherein the second inlet of the reactor for receiving a slurry phase comprising the prepolymer and/or polymer is located in the part of the second zone wherein the inner wall is either in the form of a gradually increasing inner diameter or a continuously opening cone.

In another aspect, the invention relates to a process for the continuous polymerization of one or more α-olefin monomers of which at least one is ethylene or propylene to produce a polyolefin in the system of the invention.

In the reaction system and processes of the invention, hydrogen may for instance be used as a chain transfer agent to adjust the molecular weight of the polyolefin (30) produced.

The processes of the invention are preferably conducted in an environment that is substantially free of water, oxygen and carbon dioxide, since the presence of water may negatively influence the activity of the solid polymerization catalyst.

Depending on which polyolefin is to be produced, the optimal reaction conditions can easily be determined by the person skilled in the art.

For example, generally, the temperature in the second zone (2) is preferably in the range from 0 to 130° C., for example from 20 to 110° C.

For example, generally, the temperature in the third zone (3) is preferably in the range from 20 to 130° C.

For example, the pressure in the multi-zone reactor (8) is preferably in the range from 0.1 to 10 MPa, for example in the range of 0.2 to 8 MPa.

More, in particular, the invention relates to a process for the continuous polymerization of one or more α-olefin monomers of which at least one is ethylene or propylene to produce a polyolefin in the system of the invention comprising the steps of supplying the external pipe (11) with a solid polymerization catalyst using the second inlet for receiving the solid polymerization catalyst to form a slurry comprising prepolymer and/or polymer, wherein the prepolymer and/or polymer are present in the slurry stream in an amount of from 0.01 to 99 wt % based on the total slurry stream upon introduction of the slurry stream into the reactor.

feeding the slurry stream comprising the prepolymer and/or polymer into the second inlet of the reactor above the distribution plate supplying a feed (60) comprising an α-olefin monomer and optionally supplying a feed (70) comprising condensable inert components into the apparatus for condensing the top recycle stream into a bottom recycle stream withdrawing the polyolefin (30) using the third outlet of the reactor circulating fluids from the first outlet of the reactor to the first inlet of the reactor wherein the fluids are circulated by compressing the feed (60) and the top recycle stream (40) using the apparatus for condensing the top recycle stream into a bottom recycle stream to below the dew point of the compressed fluids to form the bottom recycle stream (10) and feeding the bottom recycle stream (10) to the first zone of the multi-zone reactor (8) via the first inlet for receiving the bottom recycle stream and into the first inlet of the integral separator (9).

Even more in particular, the invention relates to a process according to the invention, for the continuous polymerization of one or more α-olefin monomers of which at least one is ethylene or propylene to produce a polyolefin in the system of the invention,
wherein a feed (60) is supplied to the first connection means (AA) and wherein optionally feed (70) is supplied to the second connection means (BB) and|
wherein the top recycle stream is condensed into the bottom recycle stream by compressing the feed (60) and the top recycle stream (40) using the compressor (400) to form compressed fluids (50) and wherein the compressed fluids (50) are cooled to below the dew point of the compressed fluids using the cooling unit (5) to form the bottom recycle stream (10).

As described above, the polyolefins produced using the processes of the invention have several advantages. Therefore, in another aspect, the invention relates to a polyolefin, preferably a homopolypropylene or propylene ethylene random copolymer or linear low density polyethylene or high density polyethylene obtained or obtainable by the process of the invention.

In another aspect, the invention relates to the use of the system of the invention for continuous polymerization of one or more α-olefin monomers of which at least one is ethylene or propylene.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps.

The invention claimed is:

1. A system for the continuous polymerization of one or more α-olefin monomers of which at least one is ethylene or propylene, the system comprising a reactor, a compressor, a cooling unit and an external pipe for the production of a prepolymer and/or polymer,
   wherein the reactor comprises a first outlet for a top recycle stream,
   wherein the system comprises apparatus for condensing the top recycle stream into a bottom recycle stream,
   wherein the reactor comprises a first inlet for receiving a bottom recycle stream,
   wherein the first inlet for receiving the bottom recycle stream is located underneath the distribution plate,
   wherein the reactor comprises an integral separator for separation of the bottom recycle stream into a gas/liquid phase and a liquid phase,
   wherein the integral separator is located underneath the distribution plate,
   wherein the first inlet of the integral separator is connected to a first outlet for a liquid phase,
   wherein the first outlet for the liquid phase is connected to the second outlet of the reactor for the liquid phase,
   wherein the second outlet of the reactor provides the liquid phase to the first inlet of the external pipe,
   wherein the external pipe comprises a second inlet for receiving a solid polymerization catalyst,
   wherein the first outlet of the external pipe is connected to a second inlet of the reactor for receiving a slurry phase comprising the prepolymer and/or polymer,
   wherein the reactor comprises a third outlet for providing polyolefin, and
   wherein the system comprises a first inlet for receiving a feed and optionally a second inlet for receiving a feed.

2. The system according to claim 1
   wherein the first outlet of the reactor is connected to a first inlet of a compressor via a first connection means (AA),
   wherein the compressor comprises a first outlet for compressed fluids, wherein the first outlet of the compressor is connected to a first inlet for compressed fluids of the cooling unit via a second connection means, wherein optionally the second connection means comprises a first inlet for receiving the feed,
   wherein the cooling unit comprises a first outlet for providing the bottom recycle stream which first outlet of the cooling unit is connected to the first inlet of the reactor, wherein the first connection means comprises a first inlet for receiving a feed.

3. The system according to claim 1, wherein the external pipe is a loop reactor.

4. The system according to claim 1, wherein the distribution plate comprises a conical shape.

5. The system according to claim 1, wherein the zone in the reactor above the distribution plate is divided into two or more subzones by one or more substantially vertical partition walls extending from a point located above the distribution plate to a point located below the gas expansion zone.

6. The system according to claim 1, wherein the reactor further comprises a moving bed unit, wherein the moving bed unit is provided with an inlet and an outlet which are connected to the zone in the reactor above the distribution plate, wherein in said zone shielding means are positioned such that via the outlet of the moving bed unit inflow of gas from said zone is inhibited and outflow of polymerization particles is allowed.

7. The system according to claim 1, wherein the reactor is a multi-zone reactor suitable for the continuous fluidized bed polymerization of one or more α-olefin monomers of which at least one is ethylene or propylene, which multi-zone reactor is operable in condensed mode, which multi-zone reactor comprises a first zone, a second zone, a third zone, a fourth zone and a distribution plate,
   wherein the first zone is separated from the second zone by the distribution plate,
   wherein the multi-zone reactor is extended in the vertical direction,
   wherein the second zone of the multi-zone reactor is located above the first zone, and
   wherein the third zone of the multi-zone reactor is located above the second zone,
   and wherein the fourth zone of the multi-zone reactor is located above the third zone,
   wherein the second zone contains an inner wall, wherein at least part of the inner wall of the second zone is either in the form of a gradually increasing inner diameter or a continuously opening cone, wherein the diameter or the opening increases in the vertical direction towards the top of the multi-zone reactor,
   wherein the third zone contains an inner wall, wherein at least part of the inner wall of the third zone is either in the form of a gradually increasing inner diameter or a continuously opening cone, wherein the diameter or the opening increases in the vertical direction towards the top of the multi-zone reactor,
   wherein the largest diameter of the inner wall of the third zone is larger than the largest diameter of the inner wall of the second zone.

8. The system according to claim 7, wherein the second inlet of the reactor for receiving a slurry phase comprising the prepolymer and/or polymer is located in the part of the second zone wherein the inner wall is either in the form of a gradually increasing inner diameter or a continuously opening cone and/or in the part of the third zone wherein the inner wall is either in the form of a gradually increasing inner diameter or a continuously opening cone.

9. The system according to claim 7, wherein in the multi-zone reactor in zone the area directly above the distribution plate is either in the form of a gradually increasing inner diameter or a continuously opening cone, wherein the diameter or the opening increases in the vertical direction towards the top of the multi-zone reactor and wherein the top part of the second zone has an inner wall having a cylindrical shape and wherein the top part of the second zone is connected to a bottom part of the third zone, wherein the bottom part of the third zone is either in the form of a gradually increasing inner diameter or a continuously opening cone, wherein the diameter or the opening increases in the vertical direction towards the top of the multi-zone reactor and wherein the top part of the third zone has an inner wall having a cylindrical shape and wherein the top part of the third zone is connected to the top zone.

10. The system according to claim 1, wherein the third outlet of the reactor is located below the third inlet for receiving the slurry phase comprising the prepolymer and/or polymer.

11. The system according to claim 7, wherein the first inlet of the reactor for receiving the bottom recycle stream is substantially tangential to the reactor wall.

12. A process for the continuous polymerization of one or more α-olefin monomers of which at least one is ethylene or propylene to produce a polyolefin in the system of claim 1, comprising
supplying the external pipe with a solid polymerization catalyst using the second inlet for receiving the solid polymerization catalyst to form a slurry comprising prepolymer and/or polymer, wherein the prepolymer and/or polymer are present in the slurry stream in an amount of from 0.01 to 99 wt % based on the total slurry stream upon introduction of the slurry stream into the reactor,
feeding the slurry stream comprising the prepolymer and/or polymer into the second inlet of the reactor above the distribution plate,
supplying a feed comprising an α-olefin monomer and optionally supplying a feed comprising condensable inert components into the apparatus for condensing the top recycle stream into a bottom recycle stream,
withdrawing the polyolefin using the third outlet of the reactor,
circulating fluids from the first outlet of the reactor to the first inlet of the reactor,
wherein the fluids are circulated by
compressing the feed and the top recycle stream using the apparatus for condensing the top recycle stream into a bottom recycle stream to below the dew point of the compressed fluids to form the bottom recycle stream, and
feeding the bottom recycle stream to the first zone of the multi-zone reactor via the first inlet for receiving the bottom recycle stream and into the first inlet of the integral separator.

13. The process according to claim 12,
wherein a feed is supplied to the first connection means and wherein optionally feed (70) is supplied to the second connection means,
wherein the top recycle stream is condensed into the bottom recycle stream by compressing the feed and the top recycle stream using the compressor to form compressed fluids and wherein the compressed fluids are cooled to below the dew point of the compressed fluids using the cooling unit to form the bottom recycle stream.

14. The system according to claim 6, wherein the moving bed unit is provided with gas feed means for feeding gas at one or more different levels in the moving bed unit and/or wherein preferably the outlet of the moving bed unit is provided with means for displacing metered quantities of polymer particles from the moving bed unit into the zone above the distribution plate.

15. The system according to claim 8, wherein the second inlet of the reactor for receiving a slurry phase comprising the prepolymer and/or polymer is located in the part of the second zone wherein the inner wall is either in the form of a gradually increasing inner diameter or a continuously opening cone.

16. The system according to claim 9, wherein the top part of the third zone is connected to the fourth zone.

* * * * *